US012301487B2

(12) United States Patent
Choi et al.

(10) Patent No.: US 12,301,487 B2
(45) Date of Patent: May 13, 2025

(54) ENVIRONMENT-AWARE POSITIONING REFERENCE SIGNAL (PRS)

(71) Applicant: QUALCOMM Incorporated, San Diego, CA (US)

(72) Inventors: Chang-Sik Choi, Seoul (KR); Kapil Gulati, Belle Mead, NJ (US); Piyush Gupta, Bridgewater, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/377,325

(22) Filed: Jul. 15, 2021

(65) Prior Publication Data
US 2022/0069958 A1 Mar. 3, 2022

Related U.S. Application Data

(60) Provisional application No. 63/071,759, filed on Aug. 28, 2020.

(51) Int. Cl.
*H04L 5/00* (2006.01)
*H04B 7/08* (2006.01)
*H04W 72/0453* (2023.01)

(52) U.S. Cl.
CPC ......... *H04L 5/0048* (2013.01); *H04B 7/0897* (2013.01); *H04L 5/0041* (2013.01); *H04W 72/0453* (2013.01)

(58) Field of Classification Search
CPC ... H04L 5/0048; H04L 5/0041; H04L 5/0005; H04L 5/0096; H04B 7/0897; H04W 72/0453; H04W 24/10; H04W 64/003
See application file for complete search history.

(56) References Cited

U.S. PATENT DOCUMENTS

| 10,560,243 B2 | 2/2020 | Bai et al. | |
| 10,736,113 B2* | 8/2020 | Wang | H04W 72/51 |
| 2014/0171097 A1* | 6/2014 | Fischer | H04W 16/32 |
| | | | 455/456.1 |

(Continued)

FOREIGN PATENT DOCUMENTS

| WO | 2018132237 | 7/2018 |
| WO | 2020026211 A1 | 2/2020 |

(Continued)

OTHER PUBLICATIONS

International Search Report and Written Opinion—PCT/US2021/042004—ISA/EPO—Nov. 2, 2021.

(Continued)

*Primary Examiner* — Huy D Vu
*Assistant Examiner* — Robert Ma
(74) *Attorney, Agent, or Firm* — Muncy, Geissler, Olds & Lowe, P.C./Qualcomm

(57) ABSTRACT

Disclosed are various techniques for wireless communication. In an aspect, a method of wireless communication includes determining, based on environment information about an environment in which a user equipment (UE) that is receiving positioning reference signals (PRSs) using a first bandwidth (BW) is operating, a second BW to be used by the UE for receiving PRSs, and transmitting PRSs using the second BW to be used by the UE for receiving PRSs.

25 Claims, 11 Drawing Sheets

(56) References Cited

U.S. PATENT DOCUMENTS

| | | | |
|---|---|---|---|
| 2019/0364570 A1 | 11/2019 | Kumar et al. | |
| 2020/0235877 A1* | 7/2020 | Manolakos | H04W 72/04 |
| 2021/0297216 A1* | 9/2021 | Shreevastav | G01S 1/20 |
| 2021/0333353 A1* | 10/2021 | Busin | G01S 5/0278 |

FOREIGN PATENT DOCUMENTS

| | | | |
|---|---|---|---|
| WO | 2020096516 A1 | 5/2020 | |
| WO | WO-2021228406 A1 * | 11/2021 | G01S 5/0036 |

OTHER PUBLICATIONS

Nokia, et al., "PRS Configuration for OTDOA Positioning in FeMTC", 3GPP Draft, 3GPP TSG RAN WG1 Mtg #87, R1-1611489,3rd Gen Partnership Project (3GPP), Mobile Competence Centre, 650, Route Des Lucioles, F-06921, Sophia-Antipolis Cedex, FR, vol. RAN WG1. No. Reno. USA, Nov. 14, 2016-Nov. 18, 2016, Nov. 13, 2016 (Nov. 13, 2016), XP051175467,3 pgs,Retrieved from Internet:URL:http://www.3gpp.org/ftp/Mtgs_3GPP_SYNC/RAN1/Docs/ [retrieved Nov. 13, 2016],section 1-2. 2.3,Para"2 .PRS configuration for Tranmission Point" Para "3. PRS configuration for UE".

VIVO: "Discussion on Potential Positioning Enhancements", 3GPP Draft, R1-2005381, 3GPP TSG RAN WG1 #102-e, 3rd Gen Partnership Project (3GPP), Mobile Competence Centre, 650, Route Des Lucioles, F-06921 Sophia-Antipolis Cedex, FR, vol. RAN WG1. No. e-Meeting, Aug. 17, 2020-Aug. 28, 2020, Aug. 8, 2020 (Aug. 8, 2020), XP051917406, 20 Pages, Retrieved from the Internet: URL:https://ftp.3gpp.org/tsg_ran/WG1_RL1/TSGR1_102-e/Docs/R1-2005381.zip R1-2005381 enhancements.docx [retrieved Aug. 8, 2020] Paragraph "6 Consideration for NLOS scenario", Section 5.

* cited by examiner

ENVIRONMENT-AWARE POSITIONING REFERENCE SIGNAL (PRS)

CROSS-REFERENCE TO RELATED APPLICATIONS

This application claims priority to U.S. Provisional Patent Application No. 63/071,759, filed Aug. 28, 2020, entitled "ENVIRONMENT-AWARE POSITIONING REFERENCE SIGNAL (PRS)," which is assigned to the assignee hereof and is expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communication (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Moreover, positioning reference signals (PRSs) may be utilized in a 5G network for range determination, when locating a mobile device. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a transmitting entity (TE) includes determining, based on environment information about an environment in which a user equipment (UE) that is receiving positioning reference signals (PRSs) using a first bandwidth (BW) is operating, a second BW to be used by the UE for receiving PRSs; and transmitting PRSs using the second BW to be used by the UE for receiving PRSs.

In an aspect, a method of wireless communication performed by a user equipment (UE) includes determining environment information about an environment in which the UE is operating using a first bandwidth (BW) for receiving positioning reference signals (PRSs); determining, based on the environment information, a second BW to be used by the UE for receiving PRSs; and using the second BW for receiving PRSs.

In an aspect, a transmitting entity (TE) includes a memory; at least one transceiver; and at least one processor communicatively coupled to the memory and the at least one transceiver, the at least one processor configured to: determine, based on environment information about an environment in which a user equipment (UE) that is receiving positioning reference signals (PRSs) using a first bandwidth (BW) is operating, a second BW to be used by the UE for receiving PRSs; and transmit, via the at least one transceiver, PRSs using the second BW to be used by the UE for receiving PRSs.

In an aspect, a user equipment (UE) includes a memory; at least one transceiver; and at least one processor communicatively coupled to the memory and the at least one transceiver, the at least one processor configured to: determine environment information about an environment in which the UE is operating using a first bandwidth (BW) for receiving positioning reference signals (PRSs); determine, based on the environment information, a second BW to be used by the UE for receiving PRSs; and use the second BW for receiving PRSs.

In an aspect, a transmitting entity (TE) includes means for determining, based on environment information about an environment in which a user equipment (UE) that is receiving positioning reference signals (PRSs) using a first bandwidth (BW) is operating, a second BW to be used by the UE for receiving PRSs; and means for transmitting PRSs using the second BW to be used by the UE for receiving PRSs.

In an aspect, a user equipment (UE) includes means for determining environment information about an environment in which the UE is operating using a first bandwidth (BW) for receiving positioning reference signals (PRSs); means for determining, based on the environment information, a second BW to be used by the UE for receiving PRSs; and means for using the second BW for receiving PRSs.

In an aspect, a non-transitory computer-readable medium storing computer-executable instructions that, when executed by a transmitting entity (TE), cause the TE to: determine, based on environment information about an environment in which a user equipment (UE) that is receiving positioning reference signals (PRSs) using a first bandwidth (BW) is operating, a second BW to be used by the UE for receiving PRSs; and transmit PRSs using the second BW to be used by the UE for receiving PRSs.

In an aspect, a non-transitory computer-readable medium storing computer-executable instructions that, when executed by a user equipment (UE), cause the UE to: determine environment information about an environment in which the UE is operating using a first bandwidth (BW) for receiving positioning reference signals (PRSs); determine, based on the environment information, a second BW to be used by the UE for receiving PRSs; and use the second BW for receiving PRSs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
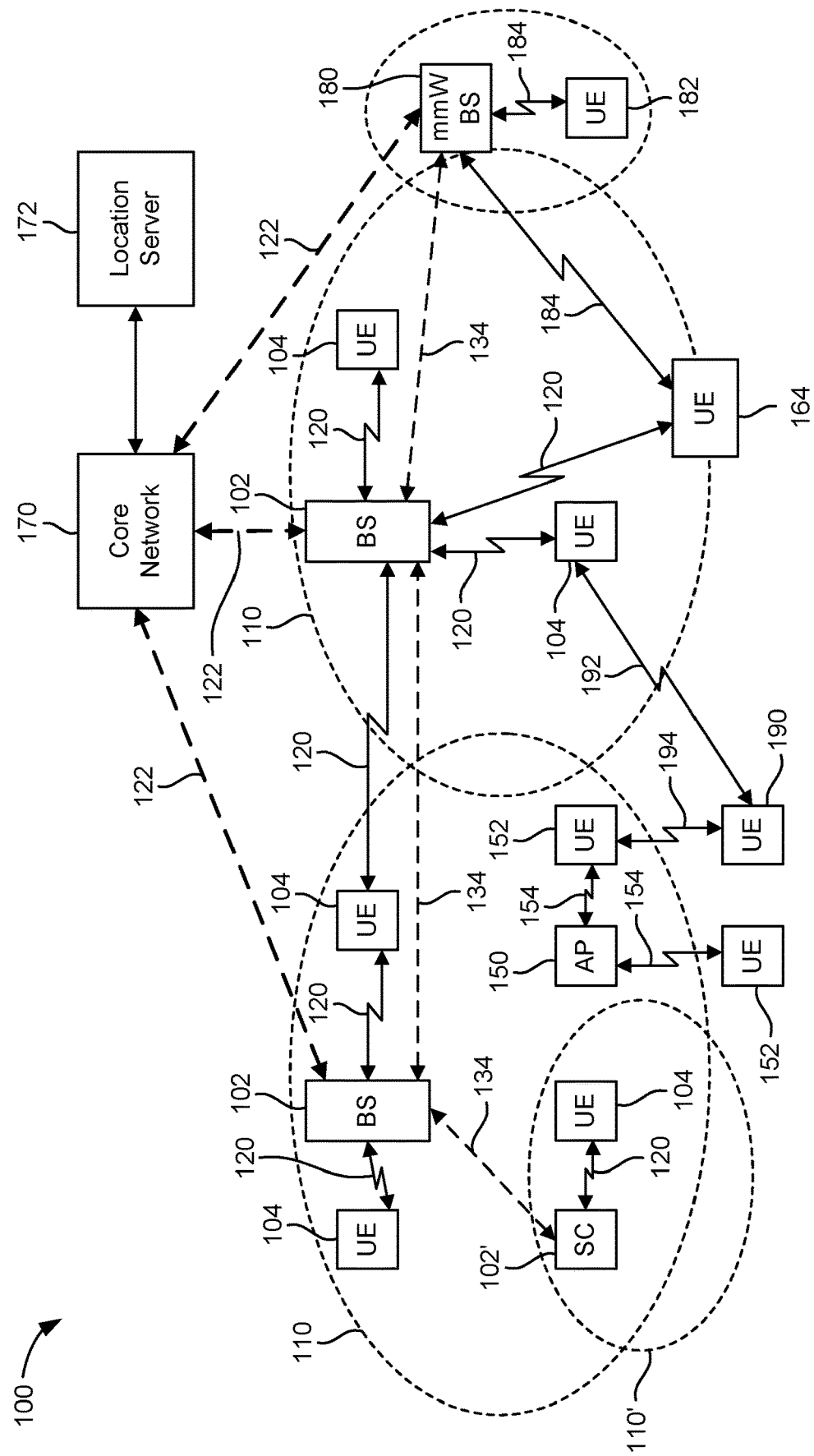
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

In order to help determine the location or position of a user equipment (UE) within a telecommunications network, and to obtain ranging between a receiving UE and a transmitting entity, the UE may perform a measurement of a positioning reference signal (PRS), which is a downlink (DL) signal transmitted by a transmission/reception point (TRP), which may be a base station (BS). A typical PRS message includes a pseudo-random sequence initialized by some aspect of the network but without any specific payload. The distance from the PRS transmitter can be inferred from its time of arrival (ToA). The UE can then report the ToA difference for PRS signals received from multiple distinct TRPs, and a core network node such as a location server (LS) can use the reports to determine the ranging from the TRPs to the UE, which may then be used to determine the location or position of the UE in 3D or geographic space. Uplink (UL) positioning is also possible, using sounding reference signals (SRSs) transmitted by UEs. Based on the received SRSs, the base stations can measure and report (to the location server) the arrival time, the received power, and the angle of arrival from which the position of the UE can be estimated. The time difference between DL reception and UL transmission can also be reported and used in round-trip time (RTT) based positioning schemes, where the distance between a base station and a UE can be determined based on the estimated RTT. By combining several such RTT measurements, involving different base stations, the position can be determined.

The conventional methods described above have some disadvantages. For example, when line of sight (LOS) between the PRS transmitter and the receiving UE is blocked, or when there are multipath reflections of the PRS signal, the receiving UE cannot easily determine the correct ToA. For example, if the UE receives only a non-line of sight (NLOS) signal, i.e., one that is reflected off an object, the ToA of the NLOS signal will be longer than for a LOS signal, resulting in an incorrect range value between the UE and the PRS transmitter. Likewise, when there are too many reflected signals, even in the presence of a non-reflected signal, it may be difficult for the UE to determine which, if any, of the signals is a true LOS signal. Thus, one technical challenge is to identify whether a PRS signal is LOS or NLOS so that NLOS measurements can be disregarded.

Another disadvantage relates to the bandwidth over which the PRS signal is transmitted and received. The time domain representation (duration) of a PRS is inversely proportional to the PRS bandwidth. A higher bandwidth PRS provides a higher resolution of PRS ToA at the receiving UE, which results in more accurate ranging and positioning, but consumes more power, while a lower bandwidth PRS consumes less power but produces a less accurate result. In conventional networks, the PRS bandwidth is decided by the network, which configures the UE accordingly. PRS frequency resources are often limited, however, and thus PRS bandwidth is constrained by the resources available on the UE. Thus, another technical challenge is that the PRS bandwidth decided by the network may not be optimal, e.g., it may cause the UE to consume more power than necessary or may cause the UE to have less ranging accuracy than desired.

To overcome the technical disadvantages of conventional systems and methods described above, mechanisms by which the bandwidth used by a user equipment (UE) for positioning reference signal (PRS) can be dynamically adjusted, e.g., response to environmental conditions, are presented. For example, a UE receiver may indicate to a transmitting entity a condition of the environment in which the UE is operating, and in response the transmitting entity may adjust the PRS bandwidth.

The words "exemplary" and "example" are used herein to mean "serving as an example, instance, or illustration." Any aspect described herein as "exemplary" or "example" is not necessarily to be construed as preferred or advantageous over other aspects. Likewise, the term "aspects of the disclosure" does not require that all aspects of the disclosure include the discussed feature, advantage, or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" (UT), a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network, to the Internet, or to both are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, signaling connections, or various combinations thereof for the supported UEs. In some systems a base station may provide purely edge node signaling functions while in other systems it may provide additional control functions, network management functions, or both. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, signaling connections, or various combinations thereof for UEs), but may instead transmit reference signals to UEs to be measured by the UEs, may receive and measure signals transmitted by the UEs, or both. Such a base station may be referred to as a positioning beacon (e.g., when transmitting signals to UEs), as a location measurement unit (e.g., when receiving and measuring signals from UEs), or both.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an exemplary wireless communications system 100 according to various aspects. The wireless communications system 100 (which may also be referred to as a wireless wide area network (WWAN)) may include various base stations 102 and various UEs 104. The base stations 102 may include macro cell base stations (high power cellular base stations), small cell base stations (low power cellular base stations), or both. In an aspect, the macro cell base station may include eNBs, ng-eNBs, or both, where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102, downlink (also referred to as forward link) transmissions from a base station 102 to a UE 104, or both. The communication links 120 may use MIMO antenna technology, including spatial multiplexing, beamforming, transmit diversity, or various combinations thereof. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152, the WLAN AP 150, or various combinations thereof may perform a clear channel assessment (CCA) or listen-before-talk (LBT) procedure prior to communicating in order to determine whether the channel is available.

The small cell base station 102' may operate in a licensed, an unlicensed frequency spectrum, or both. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to the access network, increase capacity of the access network, or both. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies, in near mmW frequencies, or combinations thereof in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit, receive, or both) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting, adjust the phase setting, or combinations thereof, of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), narrowband reference signals (NRS) tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102, the mmW base station 180, or combinations thereof may be secondary carriers ("SCells"). The simultaneous transmission, reception, or both of multiple carriers enables the UE 104/182 to significantly increase its data transmission rates, reception rates, or both. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120, with the mmW base station 180 over a mmW communication link 184, or combinations thereof. For example, the macro cell base station 102 may support a PCell and one or more SCells for the UE 164 and the mmW base station 180 may support one or more SCells for the UE 164.

Figure 2A:
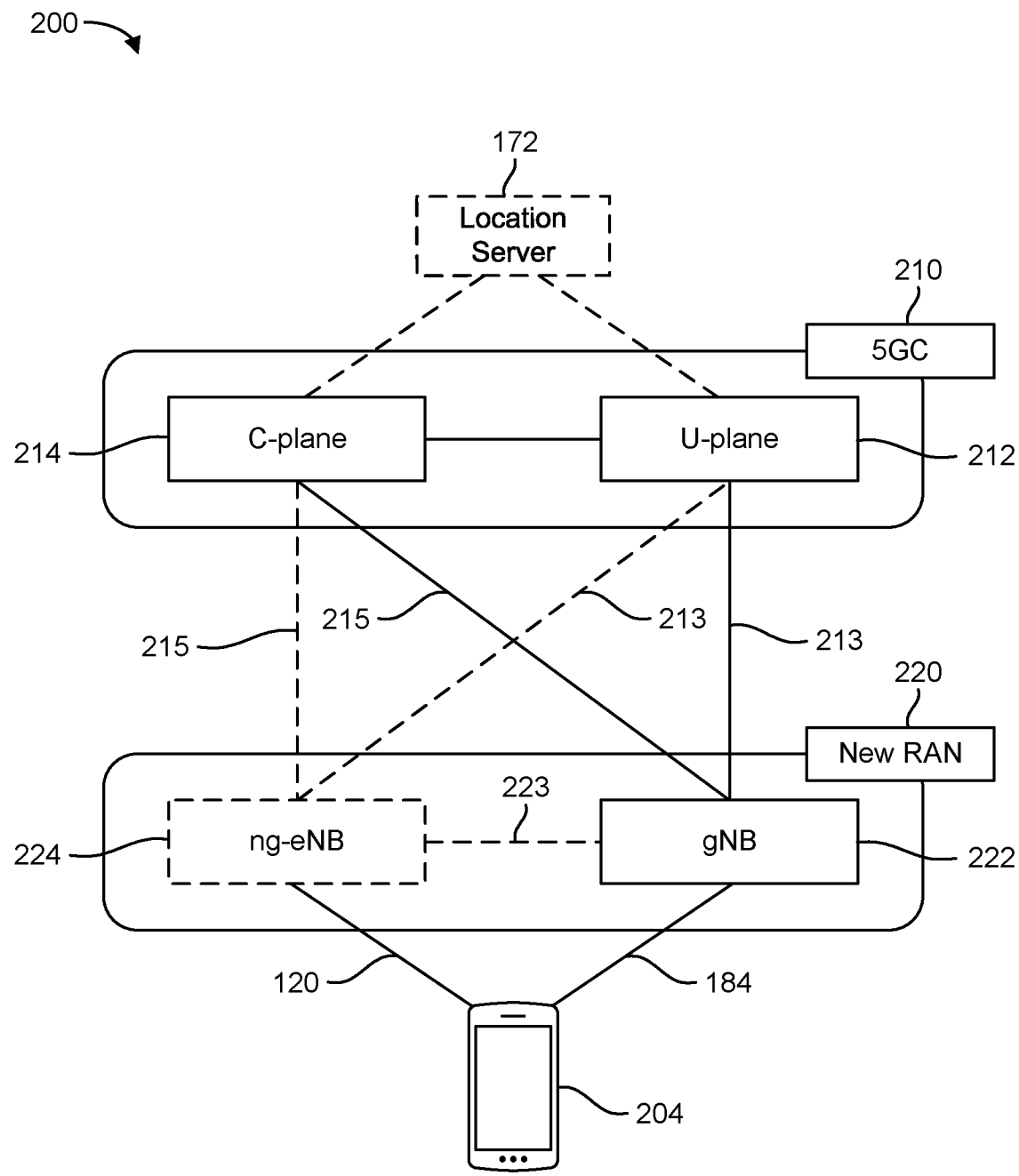
FIGS. 2A and 2B illustrate example wireless network structures, according to various aspects.

FIG. 2A illustrates an example wireless network structure 200 according to various aspects. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include a location server 172, which may be in communication with the 5GC 210 to provide location assistance for UEs 204. The location server 172 can be implemented as a plurality of separate servers (e.g., physically separate servers, different software modules on a single server, different software modules spread across multiple physical servers, etc.), or alternately may each correspond to a single server. The location server 172 can be configured to support one or more location services for UEs 204 that can connect to the location server 172 via the core network, 5GC 210, via the Internet (not illustrated), or via both. Further, the location server 172 may be integrated into a component of the core network, or alternatively may be external to the core network.

Figure 2B:
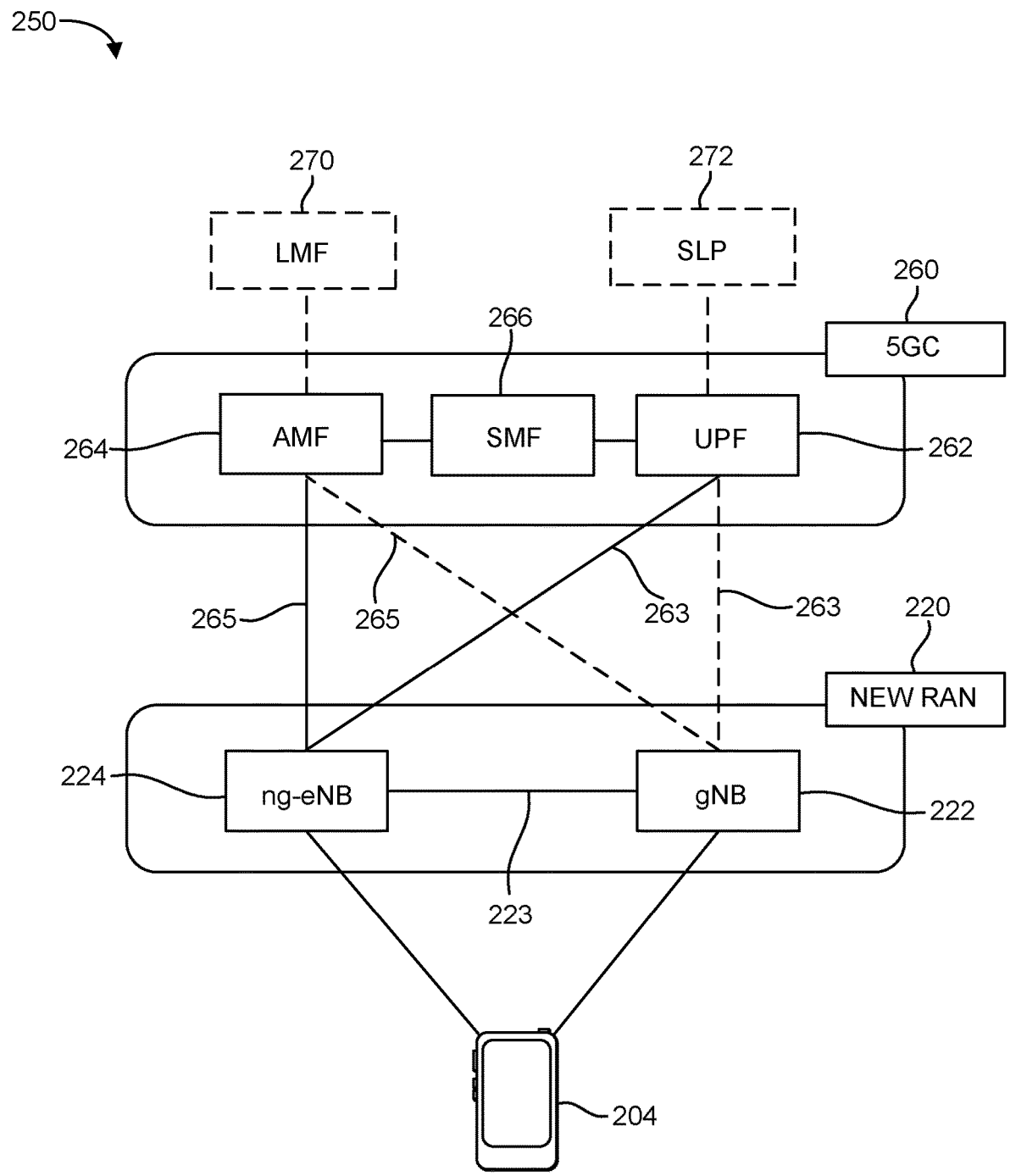

FIG. 2B illustrates another example wireless network structure 250 according to various aspects. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 172), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, via the Internet (not illustrated), or via both. The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice or data like the transmission control protocol (TCP) and/or IP).

In an aspect, the LMF 270, the SLP 272, or both may be integrated into a base station, such as the gNB 222 or the ng-eNB 224. When integrated into the gNB 222 or the ng-eNB 224, the LMF 270 or the SLP 272 may be referred to as a location management component (LMC). However, as used herein, references to the LMF 270 and the SLP 272 include both the case in which the LMF 270 and the SLP 272 are components of the core network (e.g., 5GC 260) and the case in which the LMF 270 and the SLP 272 are components of a base station.

Figure 3A:
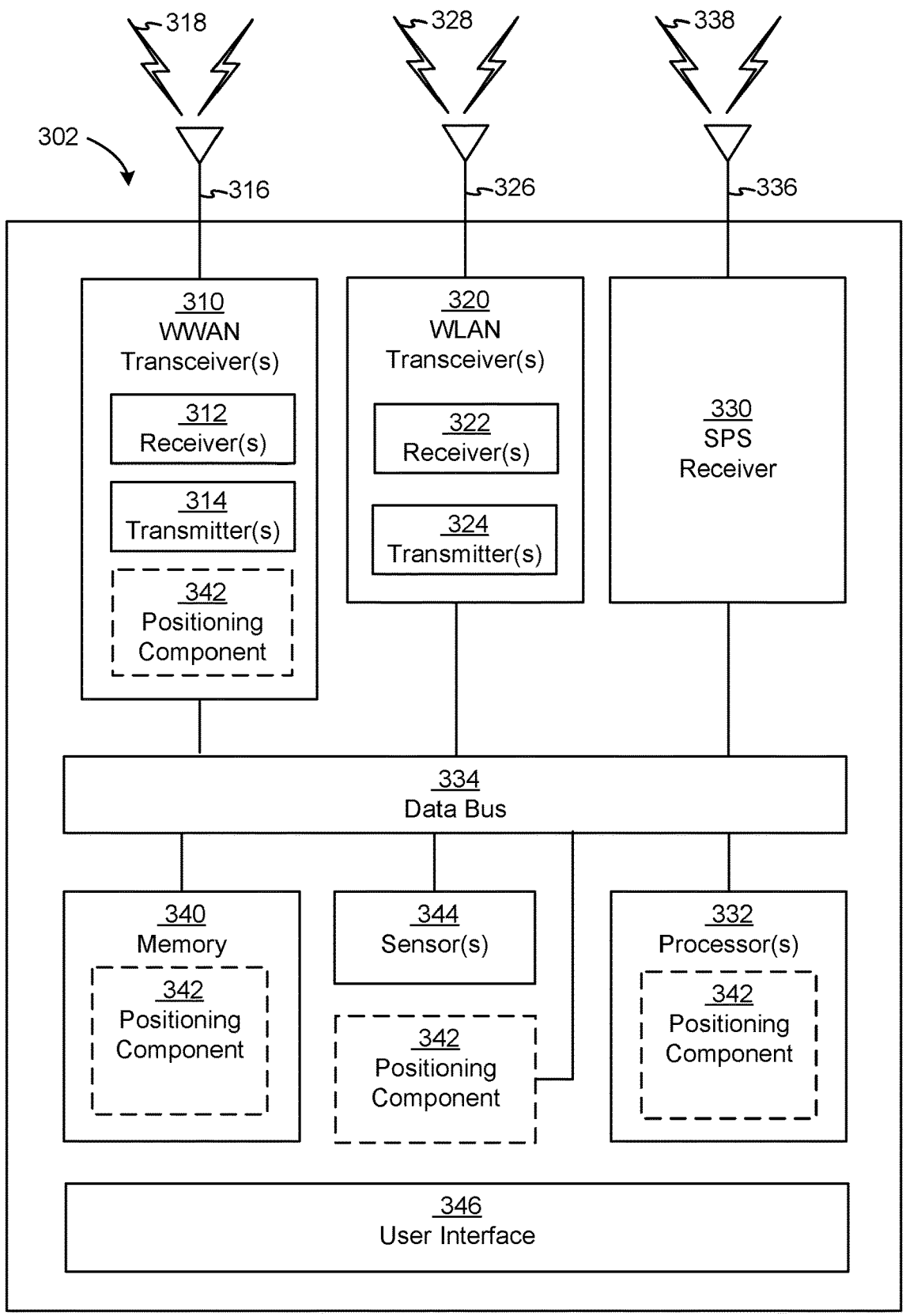
FIGS. 3A to 3C are simplified block diagrams of several sample aspects of components that may be employed in wireless communication nodes and configured to support communication according to various aspects.
Figure 3B:
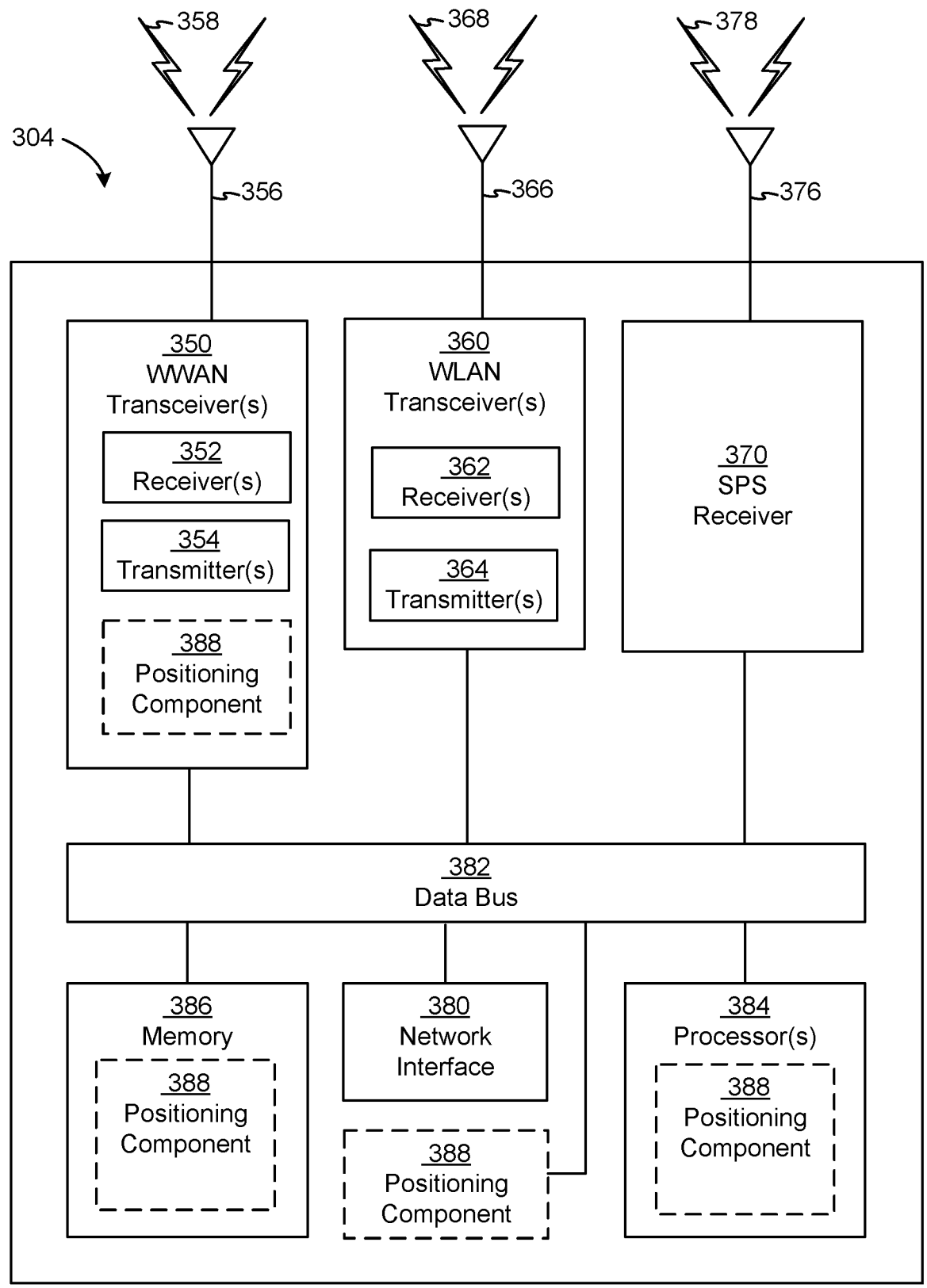
Figure 3C:
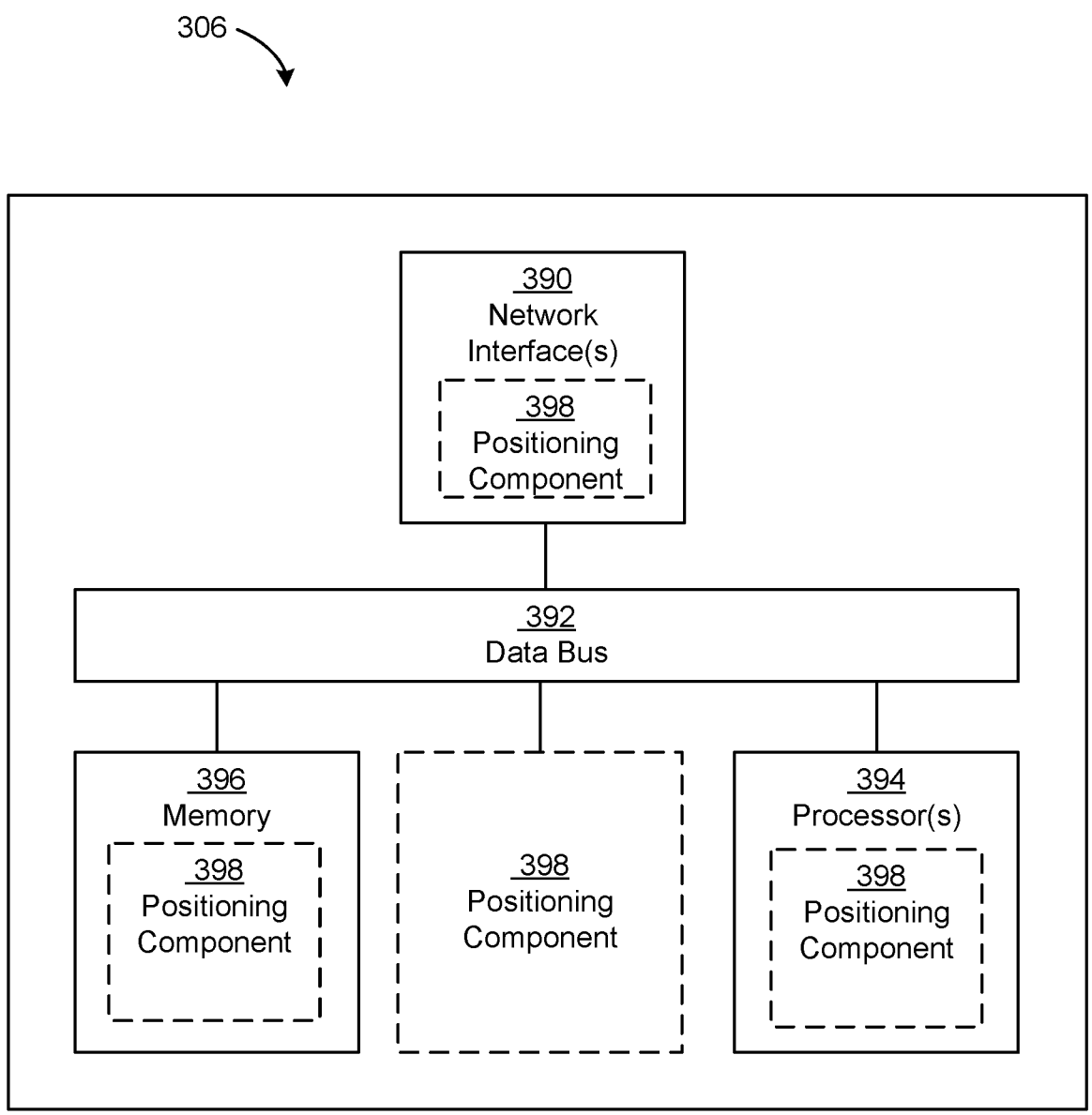

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 172 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers, communicate via different technologies, or both.

The UE 302 and the base station 304 each include wireless wide area network (WWAN) transceiver, such as WWAN transceiver 310 and WWAN transceiver 350, respectively, configured to communicate via one or more wireless communication networks (not shown), such as an NR network, an LTE network, a GSM network, or the like. The WWAN transceivers 310 and 350 may be connected to one or more antennas, such as antenna 316 and antenna 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signal 318 and signal 358 (e.g., messages, indications, information, and so on), respectively, and, conversely, for receiving and decoding signals (e.g., messages, indications, information, pilots, and so on), such as signal 318 and signal 358, respectively, in accordance with the designated RAT. Specifically, the WWAN transceivers 310 and 350 include one or more transmitters, such as transmitter 314 and transmitter 354, respectively, for transmitting and encoding signals 318 and 358, respectively, and one or more receivers, such as receiver 312 and receiver 352, respectively, for receiving and decoding signals 318 and 358, respectively.

The UE 302 and the base station 304 also include, at least in some cases, wireless local area network (WLAN) transceiver 320 and WLAN transceiver 360, respectively. The WLAN transceivers 320 and 360 may be connected to one or more antennas, such as antenna 326 and antenna 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals (e.g., messages, indications, information, and so on), such as signal 328 and signal 368, respectively, and, conversely, for receiving and decoding signals, such as signal 328 and signal 368, respectively, in accordance with the designated RAT. Specifically, the WLAN transceivers 320 and 360 include one or more transmitters, such as transmitter 324 and transmitter 364, respectively, for transmitting and encoding signals, such as signals 328 and 368, respectively, and one or more receivers, such as receiver 322 and receiver 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320, transceiver 350 and 360, or both) of the UE 302, the base station 304, or both may also comprise a network listen module (NLM) or the like for performing various measurements.

The UE 302 and the base station 304 also include, at least in some cases, satellite positioning systems (SPS) receivers, such as SPS receiver 330 and SPS receiver 370. The SPS receivers 330 and 370 may be connected to one or more antennas, such as antenna 336 and antenna 376, respectively, for receiving SPS signals, such as SPS signal 338 and SPS signal 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware, software, or both for receiving and processing the SPS signals 338 and 378, respectively. The SPS receivers 330 and 370 request information and operations as appropriate from the other systems, and perform calculations necessary to determine positions of the UE 302 and the base station 304 using measurements obtained by any suitable SPS algorithm.

The base station 304 and the network entity 306 each include at least one network interfaces, such as network interface 380 and network interface 390, for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, other types of information, or various combinations thereof.

The UE 302, the base station 304, and the network entity 306 also include other components that may be used in conjunction with the operations as disclosed herein. The UE 302 includes processor circuitry implementing processor(s) 332 for providing functionality relating to, for example, wireless positioning, and for providing other processing functionality. The base station 304 includes processor(s) 384 for providing functionality relating to, for example, wireless positioning as disclosed herein, and for providing other processing functionality. The network entity 306 includes processor(s) 394 for providing functionality relating to, for example, wireless positioning as disclosed herein, and for providing other processing functionality. In an aspect, the processor(s) 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing the memories 340, 386, and 396 (e.g., each including a memory device), respectively, for maintaining information (e.g., information indicative of reserved resources, thresholds, parameters, and so on). In some cases, the UE 302, the base station 304, and the network entity 306 may include positioning components 342, 388, and 398, respectively. The positioning components 342, 388, and 398 may be hardware circuits that are part of or coupled to the processor(s) 332, 384, and 394, respectively, that, when executed, cause the UE 302, the base station 304, and the network entity 306 to perform the functionality described herein. In other aspects, the positioning components 342, 388, and 398 may be external to the processor(s) 332, 384, and 394 (e.g., part of a modem processing system, integrated with another processing system, etc.). Alternatively, the positioning components 342, 388, and 398 may be memory modules stored in the memories 340, 386, and 396, respectively, that, when executed by the processor(s) 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory 340, the processor(s) 332, or any combination thereof, or may be a standalone component. FIG. 3B illustrates possible locations of the positioning component 388, which may be part of the WWAN transceiver 350, the memory 386, the processor(s) 384, or any combination thereof, or may be a standalone component. FIG. 3C illustrates possible locations of the positioning component 398, which may be part of the network interface(s) 390, the memory 396, the processor(s) 394, or any combination thereof, or may be a standalone component.

The UE 302 may include one or more sensors 344 coupled to the processor(s) 332 to provide movement information, orientation information, or both that is independent of motion data derived from signals received by the WWAN transceiver 310, the WLAN transceiver 320, or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), any other type of movement detection sensor, or combinations thereof. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D or 3D coordinate systems.

In addition, the UE 302 includes a user interface 346 for providing indications (e.g., audible indications, visual indications, or both) to a user, for receiving user input (e.g., upon user actuation of a sensing device such a keypad, a touch screen, a microphone, and so on), or for both. Although not shown, the base station 304 and the network entity 306 may also include user interfaces.

Referring to the processor(s) 384 in more detail, in the downlink, IP packets from the network entity 306 may be provided to the processor(s) 384. The processor(s) 384 may implement functionality for an RRC layer, a packet data convergence protocol (PDCP) layer, a radio link control (RLC) layer, and a medium access control (MAC) layer. The processor(s) 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time domain, in the frequency domain, or in both, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal, from channel condition feedback transmitted by the UE 302, or from both. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processor(s) 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processor(s) 332, which implements Layer-3 and Layer-2 functionality.

In the uplink, the processor(s) 332 provides demultiplexing between transport and logical channels, packet reassembly, deciphering, header decompression, and control signal processing to recover IP packets from the core network. The processor(s) 332 are also responsible for error detection.

Similar to the functionality described in connection with the downlink transmission by the base station 304, the processor(s) 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processor(s) 384.

In the uplink, the processor(s) 384 provide demultiplexing between transport and logical channels, packet reassembly, deciphering, header decompression, control signal processing to recover IP packets from the UE 302. IP packets from the processor(s) 384 may be provided to the core network. The processor(s) 384 are also responsible for error detection.

For convenience, the UE 302, the base station 304 and the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors, one or more ASICs (which may include one or more processors), or both. Here, each circuit may use or incorporate at least one memory for storing information or executable code used by the circuit to provide this functionality. For example, some or all of the functionality represented by blocks 310 to 346 may be implemented by processor and memory(s) of the UE 302 (e.g., by execution of appropriate code, by appropriate configuration of processor components, or by both). Similarly, some or all of the functionality represented by blocks 350 to 388 may be implemented by processor and memory(s) of the base station 304 (e.g., by execution of appropriate code, by appropriate configuration of processor components, or by both). Also, some or all of the functionality represented by blocks 390 to 398 may be implemented by processor and memory(s) of the network entity 306 (e.g., by execution of appropriate code, by appropriate configuration of processor components, or by both). For simplicity, various operations, acts, or functions are described herein as being performed "by a UE," "by a base station," "by a positioning entity," etc. However, as will be appreciated, such operations, acts, or functions may actually be performed by specific components or combinations of components of the UE, base station, positioning entity, etc., such as the processor(s) 332, 384, 394, the transceivers 310, 320, 350, and 360, the memories 340, 386, and 396, the positioning components 342, 388, and 398, etc.

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, narrowband reference signal (NRS), CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 172, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning slots, periodicity of positioning slots, muting sequence, frequency hopping sequence, reference signal identifier (ID), reference signal bandwidth, slot offset, etc.), other parameters applicable to the particular positioning method, or combinations thereof. Alternatively, the assistance data may originate directly from the base stations themselves (e.g., in periodically broadcasted overhead messages, etc.). In some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Various frame structures may be used to support downlink and uplink transmissions between network nodes (e.g., base stations and UEs).

Figure 4A:
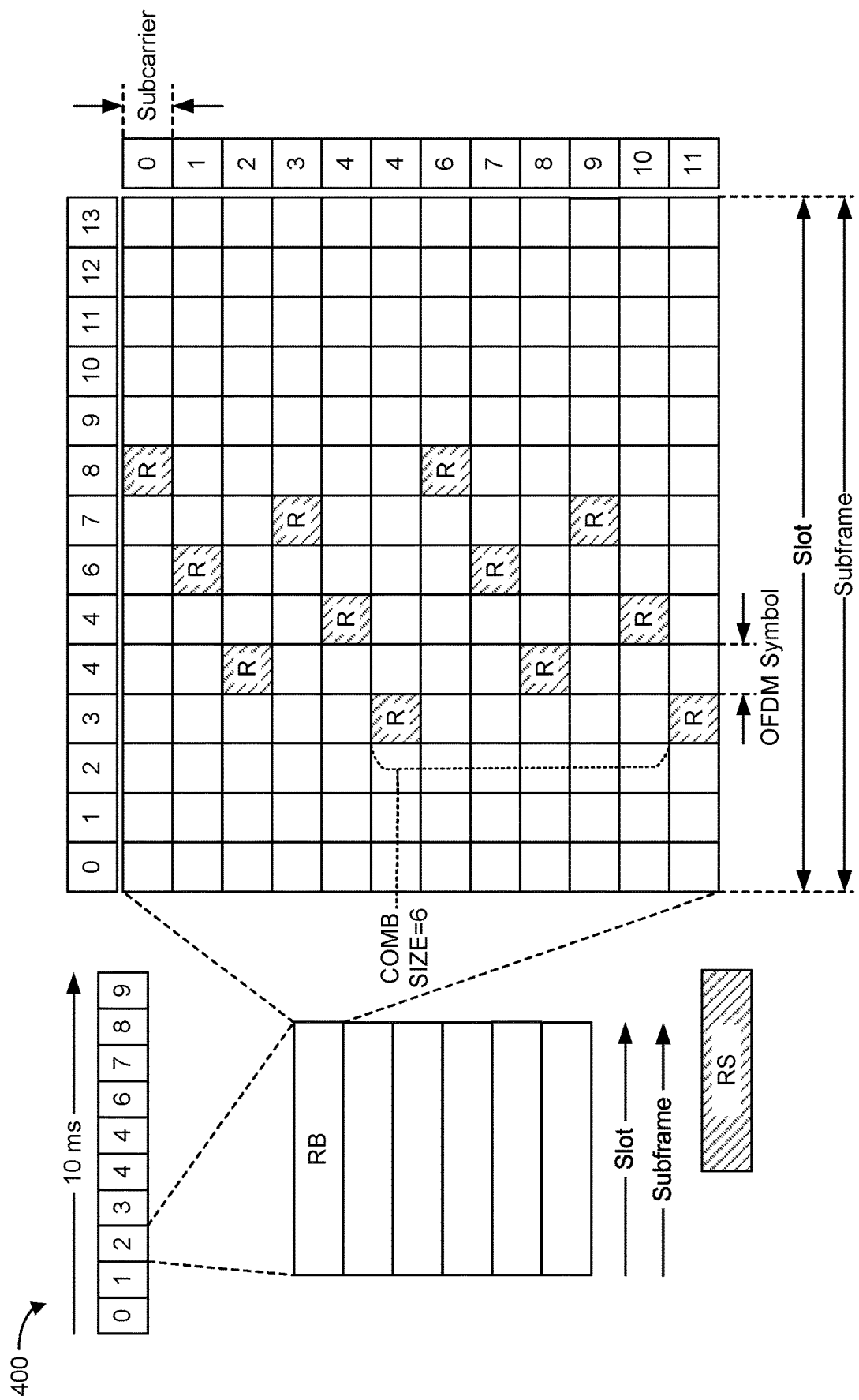
FIGS. 4A and 4B are diagrams illustrating example frame structures and channels within the frame structures, according to various aspects.

FIG. 4A is a diagram 400 illustrating an example of a downlink frame structure, according to aspects.

Figure 4B:
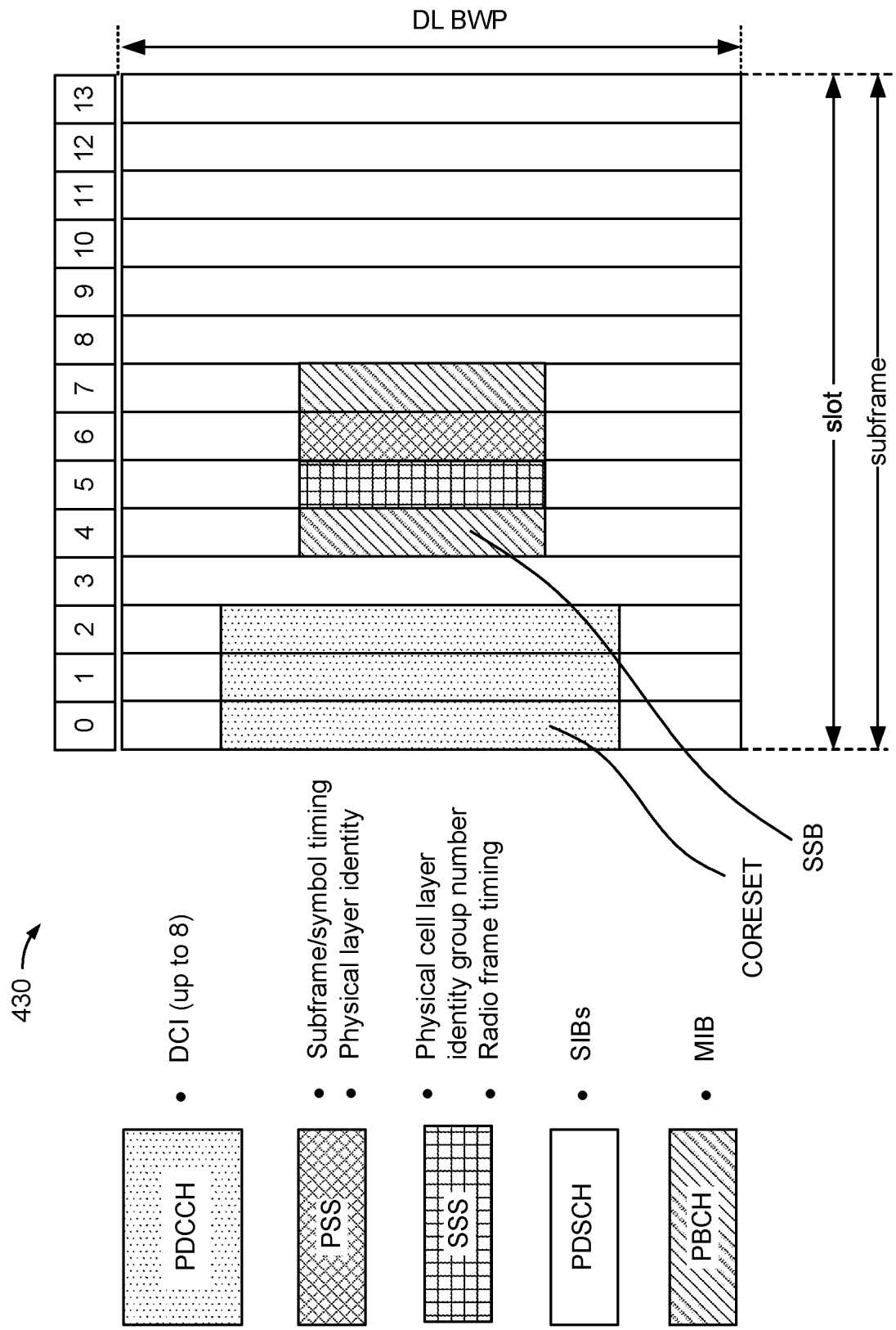

FIG. 4B is a diagram 430 illustrating an example of channels within the downlink frame structure, according to aspects. Other wireless communications technologies may have different frame structures, different channels, or both.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 504, 1024, or 2048 for system bandwidth of 1.25, 2.5, 5, 10, or 20 megahertz (MHz), respectively. The system bandwidth may also be partitioned into subbands. For example, a subband may cover 1.8 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (u), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/Slot | Slots/Subframe | Slots/Frame | Slot Duration (ms) | Symbol Duration (us) | Max. nominal system BW (MHz) with 4K FFT size |
| --- | --- | --- | --- | --- | --- | --- | --- |
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 200 |
| 3 | 120 | 14 | 8 | 80 | 0.125 | 8.33 | 400 |
| 4 | 240 | 14 | 16 | 160 | 0.0625 | 4.17 | 800 |

In the example of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). A UE may correspond to one symbol length in the time domain and one subcarrier in the frequency domain. In NR, a subframe is 1 ms in duration, a slot is fourteen symbols in the time domain, and an RB contains twelve consecutive subcarriers in the frequency domain and fourteen consecutive symbols in the time domain. Thus, in NR there is one RB per slot. Depending on the SCS, an NR subframe may have fourteen symbols, twenty-eight symbols, or more, and thus may have 1 slot, 2 slots, or more. The number of bits carried by each UE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates exemplary locations of REs carrying PRS (labeled "R").

A "PRS instance" or "PRS occasion" is one instance of a periodically repeated time window (e.g., a group of one or more consecutive slots) where PRS are expected to be transmitted. A PRS occasion may also be referred to as a "PRS positioning occasion," a "PRS positioning instance, a "positioning occasion," "a positioning instance," a "positioning repetition," or simply an "occasion," an "instance," or a "repetition."

A collection of resource elements (REs) that are used for transmission of PRS is referred to as a "PRS resource." The collection of resource elements can span multiple PRBs in the frequency domain and 'N' (e.g., 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each of the fourth symbols of the PRS resource configuration, REs corresponding to every fourth subcarrier (e.g., subcarriers 0, 4, 8) are used to transmit PRS of the PRS resource. Currently, comb sizes of comb-2, comb-4, comb-6, and comb-12 are supported for DL PRS. FIG. 4A illustrates an exemplary PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (e.g., PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5040, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," can also be referred to as a "beam." Note that this does not have any implications on whether the TRPs and the beams on which PRS are transmitted are known to the UE.

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more UE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it could be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

To overcome the technical disadvantages of conventional systems and methods described above, mechanisms by which the bandwidth used by a user equipment (UE) for positioning reference signal (PRS) can be dynamically adjusted, e.g., response to environmental conditions, are presented. For example, a UE receiver may indicate to a transmitting entity a condition of the environment in which the UE is operating, and in response, the transmitting entity may adjust the PRS bandwidth. The transmitting entity may be a base station, a core network node, or another UE.

Figure 5A:
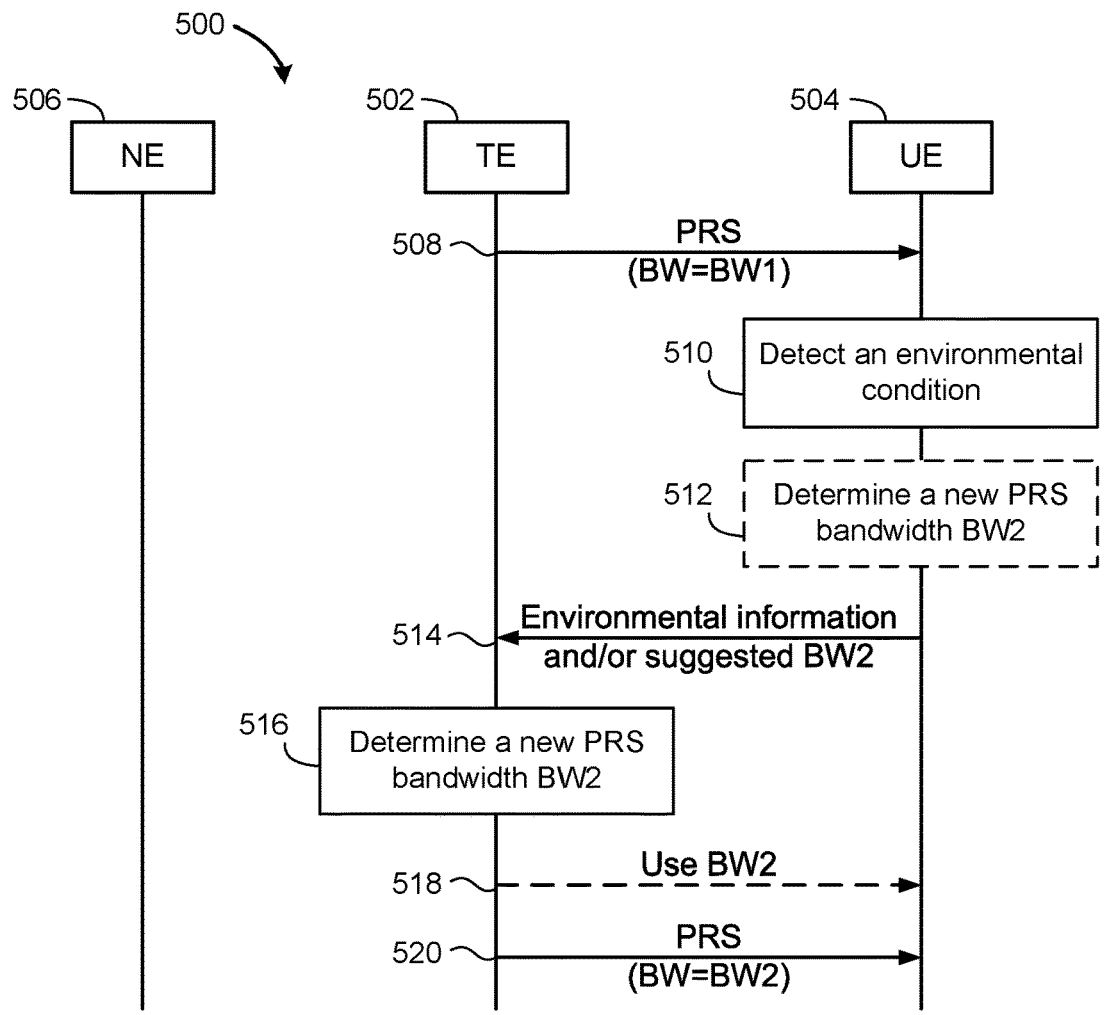
FIGS. 5A, 5B, and 6 are signal messaging diagrams showing exemplary methods of wireless communication according to various aspects.
Figure 5B:
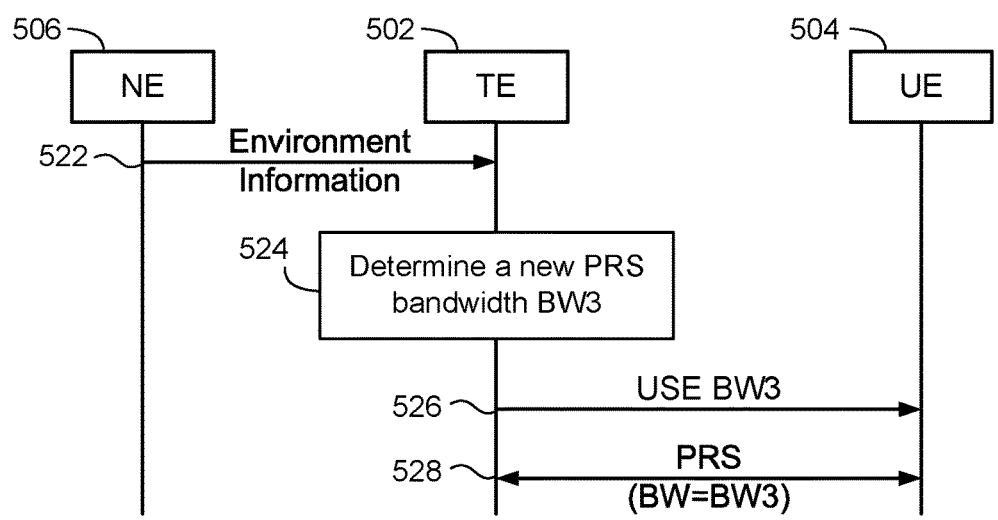

FIG. 5A and FIG. 5B are signal messaging diagrams showing portions of an exemplary method 500 of wireless communication according to various aspects. FIGS. 5A and 5B show an interaction between an entity that transmits a PRS, referred to herein as a transmitting entity (TE) 502, an entity that receives a PRS, such as a UE 504, and an entity within the core network, referred to herein as a network entity (NE) 506. In some aspects, the TE 502 may be a base station (such as, for example, BS 102, BS 180, or other gNB). In some aspects, a core network entity that controls a base station may be considered as the TE 502. In some aspects, the TE 502 may be a UE (such as, for example, UE 104, UE 152, UE 182, UE 190, or other UE). In some aspects, the NE 506 may be an entity on a core network (such as, for example, core network 170), and in some aspects may be or include a location server 172.

In the example shown in FIG. 5A, the TE 502 transmits a PRS 508 using a first bandwidth (BW1), which the UE 504 receives. The UE 504 detects an environmental condition, e.g., the UE 504 determines information about the environment in which it is operating (block 510). This information is herein referred to as environment information. For example, the environment information may include information indicating that the UE 504 has received a non-line-of-sight (NLOS) signal or that the UE 504 has not received any NLOS signals; the environment information may include information indicating that the UE 504 has detected multiple PRS sources (i.e., additional PRS sources other than the TE 502) or that the UE 504 has not detected other PRS sources; the environment information may include information indicating that the UE 504 has detected other UEs in its vicinity or that the UE 504 has not detected any other UEs in its vicinity; the environment information may include information indicating a level of multipath transmissions received by the UE 504; or other environment information. In some aspects, the UE 504 optionally determines a new PRS bandwidth (BW2) based on the environmental condition (block 512). The UE 504 transmits, to the TE 502, a message 514 that contains the environment information, the suggested BW2, or both. The TE 502 then determines a new PRS bandwidth BW2 (block 516).

For example, in some aspects, the UE forwards the environmental information to the TE 502 in message 514, and at block 516, the TE 502 determines BW2 based on the environment information that it received in message 514. In aspects where the UE 504 did not perform optional block 512 and thus has not determined BW2, the TE 502 may notify UE 504 to use BW2 via optional message 518.

In other aspects, such as where the UE 504 performs optional block 512 and thus has already determined BW2, the UE 504 may send the environmental information to TE 502 via message 514, which the TE 502 uses to determine BW2 in block 516. In this scenario, the TE 502 and the UE 504 have been configured to use a common algorithm or set of rules by which the environmental information is mapped to a bandwidth requirement, i.e., so that the TE 502 and the UE 504 will determine the same value for BW2 as each other. If the TE 502 knows that UE 504 has performed optional block 512, the TE 502 may omit sending the message 518 to the UE 504 as unnecessary. Alternatively, the TE 502 may send message 518 to the UE 504 anyway, e.g., so that the UE 504 can confirm that both the TE 502 and the UE 504 have calculated the same value for BW2, or so that the TE 502 has the opportunity to override the value of BW2 that the UE 504 may have calculated.

In yet other aspects, the UE 504 may perform optional block 512 and provide a suggested BW2 value to the TE 502 via message 514. In some aspects, the message 514 may also include the environmental information. In these aspects, the TE 502 may simply make a determination whether or not to adopt the BW2 suggested by the UE 504 and may use message 518 as an ACK/NACK message to the UE 504.

In the example shown in FIG. 5A, the TE 502 transmits PRSs using BW2 and the UE 504 processes PRSs within BW2 (messages 520).

FIG. 5B illustrates a scenario where the TE 502 is provided with environment information related to the UE 504 from NE 506 rather than from the UE 504 itself (message 522). In this scenario, the TE 502 may determine a new PRS bandwidth (BW3) to be used for PRSs (block 524), and notify the UE 504 to use BW3 (message 526), after which the TE 502 and the UE 504 use BW3 for PRS (messages 528). The environment information may include information indicating that the number of possible reflecting objects in the vicinity of the UE 504 is above or below a threshold number; the environment information may include information indicating that the PRSs received by the UE 504 are only NLOS; or other environment information. For example, the NE 506 may be a location server 172, which generally knows the geographic location of the UE 504 and has information about reflective objects in the vicinity of the UE 504.

In some aspects, the new PRS bandwidth to be used by the UE 504 (e.g., BW2, BW3) may be selected from a table. For example, a table may list sets of one or more environment conditions and a PRS bandwidth to use if the UE's current environment meets those conditions. In some aspects, the new PRS bandwidth to be used by the UE 504 may be selected according to a formula. For example, a formula may map environment conditions to coefficients which are used to calculate the new PRS bandwidth to be used. In some aspects, the new PRS bandwidth to be used by the UE 504 may be selected using a decision tree. For example, a decision tree may consider one or more of the various environment conditions that the UE 504 is currently experiencing and use them to arrive at a decision about what new PRS bandwidth should be used by the UE 504.

Each of the approaches listed above may include consideration of one or more of the environment conditions, such as, but not limited to: whether or not UE 504 has detected another UE is in the vicinity, which the UE 504 can detect based on signals received, for example; whether the UE 504 detected a single PRS source or multiple PRS sources, which the UE 504 can detect based on signals received; whether the UE 504 has detected any multipath transmissions, and if so, how many, which the UE 504 can detect based on analysis of a power delay profile of received signals, for example; other environment conditions that the UE 504 has detected or that other network entities have detected and about which have notified the UE 504; or various combinations thereof.

For example, if the environment information indicates that the UE 504 has not received any NLOS signals, that all PRSs received by the UE 504 are LOS signals, that the UE 504 has not received any multipath transmissions, that there are no other UEs within a threshold distance of the UE 504, or that the number of possible reflecting objects within a threshold distance of the UE 504 may be less than a threshold number, then the UE 504 may be able to use a narrower PRS bandwidth than what it is currently using.

In another example, if the environment information indicates that the UE 504 has received a NLOS signal, that not all PRSs received by the UE 504 are LOS signals, that the UE 504 has received a multipath transmission, that there are other UEs within a threshold distance of the UE 504, or that the number of possible reflecting objects within a threshold distance of the UE 504 is less than a threshold number, then the UE 504 may need to use a wider PRS bandwidth than what it is currently using.

In the example shown in FIG. 5, in some aspects, each of the three bandwidths BW1, BW2, and BW3 may be different from each other, i.e., the TE 502 selects between as set of three bandwidth options. In some aspects, the TE 502 selects between a set of more than three bandwidth options. In other aspects, BW1 and BW3 may be the same, i.e., in these aspects, the TE 502 selects between as set of only two bandwidth options.

In some aspects, BW1>BW2>BW3, where BW1 is the full bandwidth supported by the UE 504. In this aspect, the TE 502 starts by using the full bandwidth supported by the UE 504 but reduces the PRS bandwidth used as circumstances allow, which allows the UE 504 to reduce its power consumption. For example, FIG. 5A and FIG. 5B may illustrate that the PRS bandwidth used by the UE 504 may be decreased, and then decreased again (or increased, and then increased again).

In some aspects, BW3>BW1>BW2, where BW1 is the default PRS bandwidth used by the UE 504, which is less than the full bandwidth supported by the UE 504. In some aspects, BW3 may be the full bandwidth supported by the UE 504, but in other aspects, even BW3 is less than the full bandwidth supported by the UE 504. Thus, FIG. 5A and FIG. 5B may illustrate that the PRS bandwidth used by the UE 504 may be increased or decreased in response to environmental conditions. For example, at block 510, the UE 504 may indicate that it detects no other UEs in its vicinity, and the TE 502 responds by decreasing the PRS bandwidth, while at 518, the NE 506 may notify the TE 502 that UE 504 only has NLOS sources (which the UE 504 may not be in position to know), in which case the TE 502 responds by increasing the PRS bandwidth to be used by the UE 504.

In some aspects, the TE 502 does not select a bandwidth from a finite set of bandwidth options, but instead modifies the existing bandwidth, e.g., by increasing or decreasing the existing bandwidth by a set number (e.g., by adding or removing a number of physical resource blocks) or by a percentage (e.g., by multiplying the existing bandwidth by some percentage that may be less than or greater than 100%).

In some aspects, the environment information may be sent by the UE 504 periodically or aperiodically, e.g., in response to a trigger condition. In some aspects, the trigger condition is internal to the UE 504. For example, the trigger condition may be that a confidence level at the UE 504 has dropped below a threshold. In some aspects, the trigger condition is external to the UE 504. For example, the UE 504 may send the environment information in response to a request from the NE 506.

Figure 6:
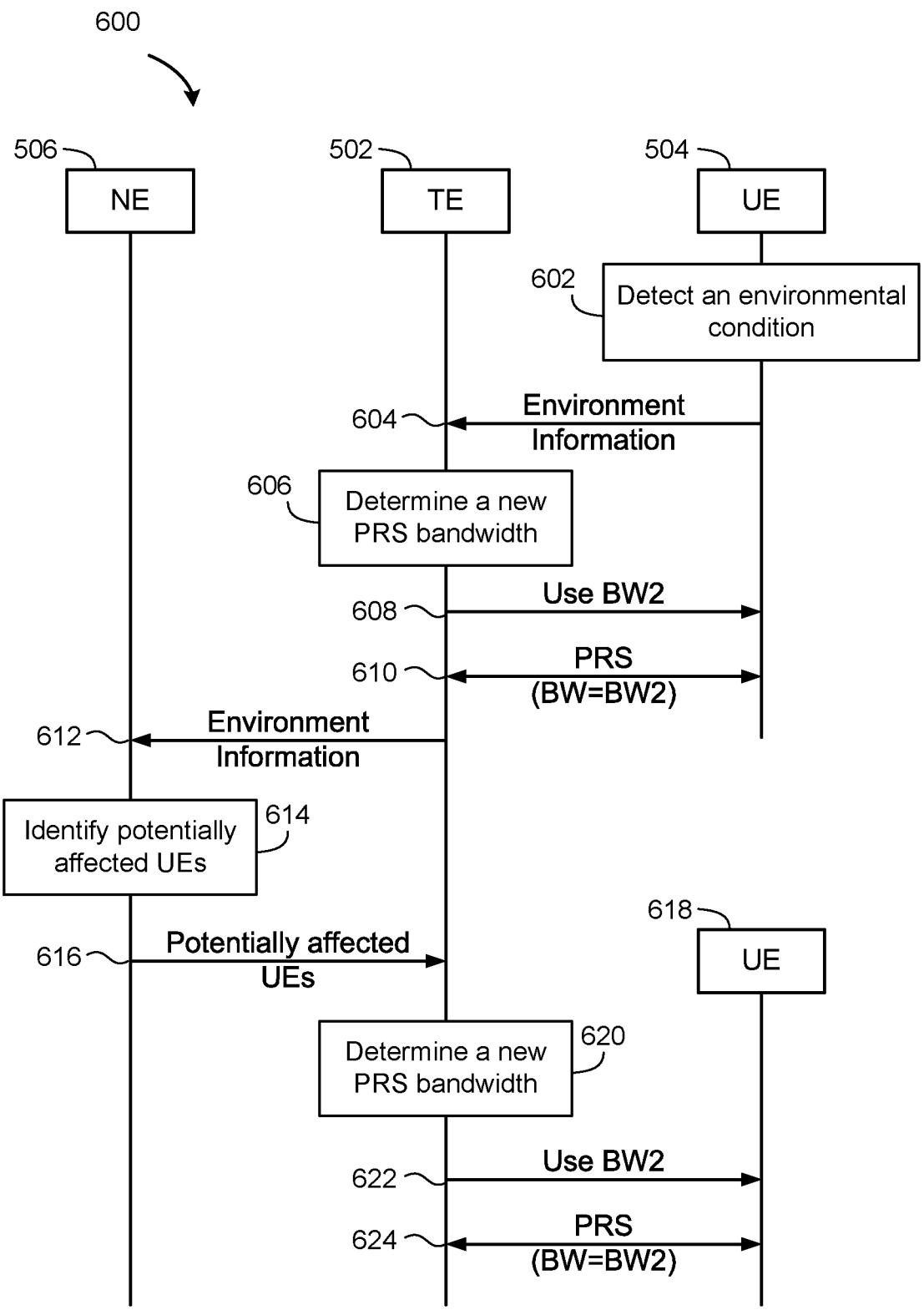

FIG. 6 is a signal messaging diagram showing an exemplary method 600 of wireless communication according to various aspects. FIG. 6 shows an interaction between a TE 502, a UE 504, and an NE 506 as shown in FIG. 5, the descriptions of which will therefore not be repeated here. As illustrated in FIG. 6, in some aspects, a UE 504 may notify nearby base stations or UEs of environmental conditions, such as environmental conditions that may have an effect on reception of PRS transmissions. In FIG. 6, at 602, the UE 504 detects an environmental condition, and at 604, notifies the TE 502 of the environmental condition. Examples of environmental conditions about which the UE 504 may notify the TE 502 include, but are not limited to, detection of LOS/NLOS from a single source, detection of single or multiple PRS sources, detection of multiple reflectors around the UE 504, and detection of no neighboring UEs. In some aspects, detecting an environmental condition may include some of the steps described for FIG. 5, block 510, which will not be repeated here.

In some aspects, the TE 502 may use this information to determine a PRS bandwidth to be used by the UE 504. Thus, in FIG. 6, At 606, the TE 502 determines, based on the environment information that it receives from the UE 504, a PRS bandwidth to be used by the UE 504. In some aspects, this may involve some of the steps described for FIG. 5, at block 516, above, which will not be repeated here. In the example shown in FIG. 6, the TE 502 determines that a new PRS bandwidth should be used. In some aspects, at 608, the TE 502 may inform the UE 504 that a second bandwidth (BW2) will be used for PRS. At 610, the TE 502, the UE 504, or both use bandwidth BW2 for PRS.

For example, the UE 504 may indicate to the TE 502 that the UE 504 seems to be near two reflecting walls. In this scenario, the TE 502 may increase the bandwidth of the PRS signal to the UE 504 so that the UE 504 can use a shorter time domain signal-which allows the UE to differentiate between the two reflections, even though those reflections are close together in time.

In some aspects, the information provided by the UE 504 may be valuable to understand an environment within which another UE is operating. Thus, in FIG. 6, at 612, the TE 502 transmits at least some of the environment information to the NE 506. At 614, the NE 506 identifies other UEs potentially affected by the environmental conditions of the UE 504, e.g., UEs that may also be in the same vicinity, for example, and at 616, the NE 506 notifies the TE 502 of the potentially affected (or actually affected) UEs. In FIG. 6, UE 618 is one of the UEs affected by the environmental conditions reported by the UE 504, and so, at 620, the TE 502 determines a new PRS bandwidth to be used by the UE 618. In some aspects, this may involve some of the steps described for FIG. 5, at block 516, above, which will not be repeated here. At 622, the TE 502 informs the UE 618 of the new PRS bandwidth, and at 624, the UE 618, the UE 504, or both use bandwidth BW2 for PRS.

Figure 7:
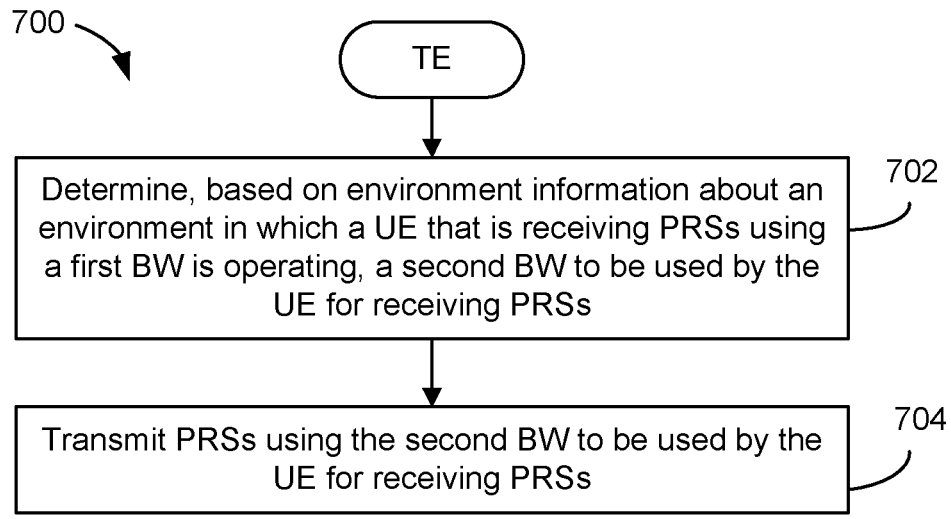
FIGS. 7 and 8 illustrate exemplary methods of wireless communication according to aspects.

FIG. 7 is a flowchart of an example process 700 associated with environment-aware positioning reference signal (PRS). In some implementations, one or more process blocks of FIG. 7 may be performed by a transmitting entity (TE), which may be a base station (e.g., BS 102, BS 304, etc.) or a peer-to-peer UE (e.g., UE 104, UE 190, UE 302, etc.). In some implementations, one or more process blocks of FIG. 7 may be performed by another device or a group of devices separate from or including the transmitting entity (TE). For example, one or more process blocks of FIG. 7 may be performed by one or more components of BS 304, such as processor(s) 384, memory 386, WWAN transceiver(s) 350, WLAN transceiver(s) 360, SPS receiver 370, and positioning component(s) 388, any or all of which may be means for performing the operations of process 700. Alternatively, one or more process blocks of FIG. 7 may be performed by one or more components of UE 302, such as processor(s) 332, memory 340, WWAN transceiver(s) 310, short-range wireless transceiver(s) 320, satellite signal receiver 330, and positioning component(s) 342, any or all of which may be means for performing the operations of process 700.

As shown in FIG. 7, process 700 may include determining, based on environment information about an environment in which a UE that is receiving PRSs using a first bandwidth (BW) is operating, a second BW to be used by the UE for receiving PRSs (block 710). Where the TE comprises a base station, for example, means for performing the operation of block 710 may include the WWAN transceiver(s) 350 and processor(s) 384 of BS 304.

In some aspects, for example, determining the second BW to be used by the UE for receiving PRSs comprises receiving, from the UE, an indication of the second BW to be used by the UE for receiving PRSs and determining the second BW to be used by the UE for receiving PRSs based on the indication. In some aspects, receiving an indication of the second BW to be used for PRS comprises receiving an indication of a selection of the second BW from a predefined set of BWs, an indication to calculate the second BW by increasing or decreasing the first BW by a number, or an indication to calculate the second BW by increasing or decreasing the first BW by a percentage value.

In other aspects, determining the second BW to be used by the UE for receiving PRSs comprises receiving the environment information about the environment in which the UE is operating, and determining the second BW to be used by the UE for receiving PRSs based on the environment information. In some aspects, the environment information is received from the UE, from another UE, from a base station, from a core network entity, or from an intelligent traffic system (ITS). In some aspects, the environment information is received in response to a request for the environment information. In some aspects, process 700 includes instructing the UE to use the second BW for receiving PRSs.

In some aspects, the environment information comprises information indicating a number of multipath transmissions received by the UE, reception of at least one non-line-of-sight (NLOS) signal by the UE, reception of no NLOS signals by the UE, a presence of another UE in a vicinity of the UE, an absence of another UE in a vicinity of the UE, that a number of possible reflecting objects in a vicinity of the UE is greater than or less than a threshold number, that none of the PRSs received by the UE are non-line-of-sight (NLOS) signals, that at least one of the PRSs received by the UE is an NLOS signal, that a PRS source is a line-of-sight (LOS) or non-line-of-sight (NLOS) source, that multiple PRS sources exist or that a single PRS source exists, that multiple reflectors are or are not detected in a vicinity of the UE, that other UEs are or are not in a vicinity of the UE, or various combinations thereof.

In some aspects, the environment information may be received from an entity other than the UE 504. For example, the environment information may be received from a core network entity, such as a location server. The environment information may include information indicating that a number of possible reflecting objects in the vicinity of the UE 504 may be greater than or less than a threshold number, that none of the PRSs received by the UE 504 are NLOS signals, that at least one of the PRSs received by the UE 504 may be an NLOS signal, or various combinations thereof. In another example, the environment information may be received via an intelligent traffic system (ITS). The environment information may include information indicating that a PRS source may be a LOS or NLOS source, that multiple PRS sources exist or that a single PRS source exists, that multiple reflectors are or are not detected in the vicinity of the UE 104, that other UEs are or are not in the vicinity of the UE 104, or various combinations thereof.

In some aspects, determining the second BW to be used by the UE for receiving PRSs comprises determining a modification to be made to the first BW, and wherein instructing the UE to use the second BW comprises instructing the UE to make the modification to the first BW.

For example, in some aspects, the environment information indicates that the UE has not received any non-line-of-sight (NLOS) signals, that all PRSs received by the UE are line-of-sight (LOS) signals, that the UE has not received any multipath transmissions, that there are no other UEs within a threshold distance of the UE, or that a number of possible reflecting objects within a threshold distance of the UE is less than a threshold number; in this scenario, for example, it may be determined that the second BW should be narrower than the first BW.

For example, in some aspects, the environment information indicates that the UE has received a non-line-of-sight (NLOS) signal, that not all PRSs received by the UE are line-of-sight (LOS) signals, that the UE has received a multipath transmission, that there are other UEs within a threshold distance of the UE, or that a number of possible reflecting objects within a threshold distance of the UE is not less than a threshold number; in this scenario, for example, it may be determined that the second BW should be wider than the first BW.

In some aspects, determining the second BW to be used by the UE for receiving PRSs comprises selecting the second BW from a predefined set of BWs, calculating the second BW by increasing or decreasing the first BW by a number, or calculating the second BW by increasing or decreasing the first BW by a percentage value.

Determining the second BW to be used by the UE for receiving PRSs may include determining a modification to be made to a PRS BW currently used by the UE 504. Instructing the UE 504 to use the PRS BW may include instructing the UE 504 to make the modification. The environment information may be received in response to a request for the environment information.

Determining the second BW to be used by the UE for receiving PRSs may include determining to use a first bandwidth (BW1) or a second bandwidth (BW2) that may be less than BW1, based on the environment information. BW1 may include the entire bandwidth supported by the UE 504. BW1 may include less than the entire bandwidth supported by the UE 504.

Determining the second BW to be used by the UE for receiving PRSs based on the environment information may include using BW2 if the environment information indicates that the UE 504 has not received any NLOS signals, that all PRSs received by the UE 504 are LOS signals, that the UE 504 has not received any multipath transmissions, that there are no other UEs within a threshold distance of the UE 504, that the number of possible reflecting objects within a threshold distance of the UE 504 may be less than a threshold number, or various combinations thereof.

Determining the second BW to be used by the UE for receiving PRSs based on the environment information may include using BW1 if the environment information indicates that the UE 504 has received a NLOS signal, that not all PRSs received by the UE 504 are LOS signals, that the UE 504 has received a multipath transmission, that there are other UEs within a threshold distance of the UE 504, that the number of possible reflecting objects within a threshold distance of the UE 504 is less than a threshold number, or various combinations thereof.

Determining the second BW to be used by the UE for receiving PRSs may include determining to decrease or increase a current PRS BW used by the UE 504, based on the environment information. Determining to decrease or increase the current PRS BW used by the UE 504 may include selecting one bandwidth from a predefined set of bandwidths. One of the bandwidths from the predefined set of bandwidths may include the entire bandwidth supported by the UE 504. The predefined set of bandwidths may define three different bandwidths. The predefined set of bandwidths may define more than three different bandwidths. Determining to decrease or increase the current PRS BW used by the UE 504 may include increasing or decreasing the current PRS BW used by the UE 504 by a number or percentage value.

Determining the second BW to be used by the UE for receiving PRSs based on the environment information may include decreasing the current PRS BW used by the UE 504 if the environment information indicates that the UE 504 has not received any NLOS signals, that all PRSs received by the UE 504 are line-of-sight (LOS) signals, that the UE 504 has not received any multipath transmissions, that there are no other UEs within a threshold distance of the UE 504, that the number of possible reflecting objects within a threshold distance of the UE 504 is less than a threshold number, or various combinations thereof.

Determining the second BW to be used by the UE for receiving PRSs based on the environment information may include increasing the current PRS BW used by the UE 504 if the environment information indicates that the UE 504 has received a NLOS signal, that not all PRSs received by the UE 504 are LOS signals, that the UE 504 has received a multipath transmission, that there are other UEs within a threshold distance of the UE 504, that the number of possible reflecting objects within a threshold distance of the UE 504 is not less than a threshold number, or various combinations thereof.

As further shown in FIG. 7, process 700 may include using the second BW for PRSs (block 720). Where the TE comprises a base station, for example, means for performing the operation of block 720 may include the WWAN transceiver(s) 350 of BS 304. For example, the BS 304 may transmit the PRSs using the transmitter(s) 354 using the second BW for PRSs.

Process 700 may include additional implementations, such as any single implementation or any combination of implementations described below and/or in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
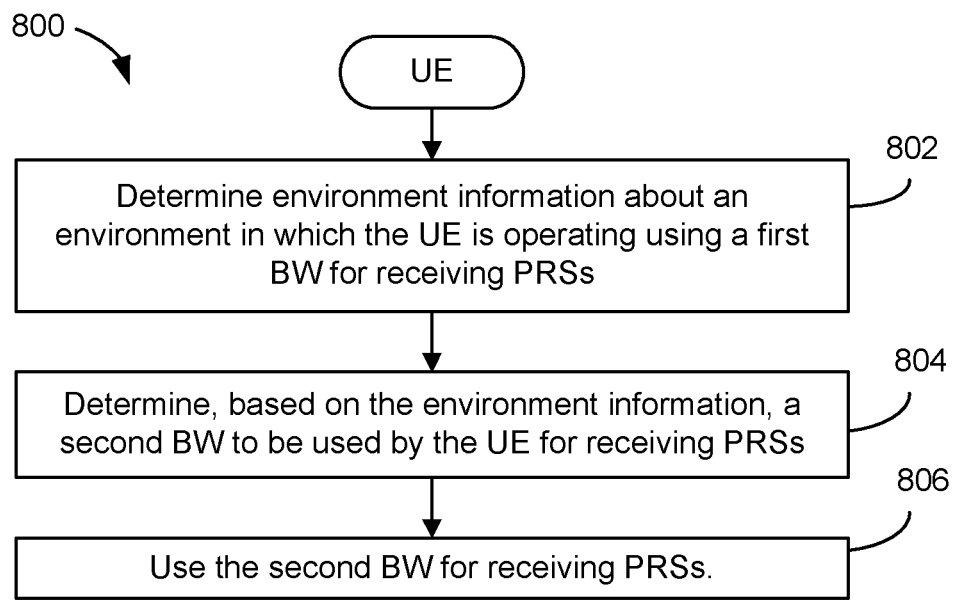

FIG. 8 is a flowchart of an example process 800 associated with environment-aware positioning reference signal (prs). In some implementations, one or more process blocks of FIG. 8 may be performed by a user equipment (UE) (e.g., user equipment (UE) REFNUMBER). In some implementations, one or more process blocks of FIG. 8 may be performed by another device or a group of devices separate from or including the user equipment (UE). Alternatively, one or more process blocks of FIG. 8 may be performed by one or more components of UE 302, such as processor(s) 332, memory 340, WWAN transceiver(s) 310, short-range wireless transceiver(s) 320, satellite signal receiver 330, and positioning component(s) 342, any or all of which may be means for performing the operations of process 800.

As shown in FIG. 8, process 800 may include determining environment information about an environment in which the UE is operating using a first BW for receiving PRSs (block 810). Means for performing the operation of block 810 may include the WWAN transceiver(s) 310, processor(s) 332, and sensor(s) 344 of UE 302. For example, the UE 302 may determine environment information about an environment in which the UE 302 is operating based on measurements of signals received by the receiver(s) 312, data or information received by sensor(s) 344, the product of analysis by processor(s) 332, and so on. In some aspects, the environment information comprises information indicating a number of multipath transmissions received by the UE, reception of at least one non-line-of-sight (NLOS) signal by the UE, reception of no NLOS signals by the UE, a presence of another UE in a vicinity of the UE, an absence of another UE in a vicinity of the UE, or various combinations thereof. The environment information may include information indicating a number of multipath transmissions received by the UE 504, reception of at least one NLOS signal by the UE 504, reception of no NLOS signals by the UE 504, the presence of another UE 104 in the vicinity of the UE 504, the absence of another UE 104 in the vicinity of the UE 504, or various combinations thereof.

As further shown in FIG. 8, process 800 may include determining, based on the environment information, a second BW to be used by the UE for receiving PRSs (block 820). Means for performing the operation of block 820 may include the processor(s) 332 of UE 302. For example, the processor(s) 332 of UE 302 may determine the second BW to be used for PRS. For example, in some aspects, the UE 302 may determine the second BW based on its own analysis of the environment information using the processor(s) 332.

In other aspects, determining the second BW comprises sending environment information to a base station, peer UE, or other transmitting entity (TE), and receiving, from the TE, an indication of the second BW to be used for PRSs. In some aspects, receiving an indication of the second BW to use for PRSs comprises receiving an instruction to selecting the second BW from a predefined set of BWs, calculating the second BW by increasing or decreasing the first BW by a number, or calculating the second BW by increasing or decreasing the first BW by a percentage value.

As further shown in FIG. 8, process 800 may include using the second BW for receiving PRSs (block 830). Means for performing the operation of block 830 may include the WWAN transceiver(s) 310, processor(s) 332, and sensor(s) 344 of UE 302. For example, the UE 302 may receive and process PRSs using receiver(s) 312.

In some aspects, the determining and sending steps are performed in response to a trigger. In some aspects, the trigger is generated internally by the UE. For example, in some aspects, the trigger comprises detection that a confidence level has satisfied or no longer satisfies a confidence level threshold. In some aspects, the trigger is a periodic trigger or an aperiodic trigger. In some aspects, the trigger is an external trigger received by the UE. In some aspects, the trigger is a request from a core network entity.

Process 800 may include additional implementations, such as any single implementation or any combination of implementations described below and/or in connection with one or more other processes described elsewhere herein. Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences, and algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a transmitting entity (TE), the method comprising: determining, based on environment information about an environment in which a user equipment (UE) that is receiving positioning reference signals (PRSs) using a first bandwidth (BW) is operating, a second BW to be used by the UE for receiving PRSs; and transmitting PRSs using the second BW to be used by the UE for receiving PRSs.

Clause 2. The method of clause 1, wherein determining the second BW to be used by the UE for receiving PRSs comprises receiving the environment information about the environment in which the UE is operating, and determining the second BW to be used by the UE for receiving PRSs based on the environment information.

Clause 3. The method of clause 2, wherein the environment information is received from the UE, from another UE, from a base station, from a core network entity, or from an intelligent traffic system (ITS).

Clause 4. The method of any of clauses 2 to 3, wherein the environment information is received in response to a request for the environment information.

Clause 5. The method of any of clauses 2 to 4, wherein receiving the environment information comprises receiving information indicating: a number of multipath transmissions received by the UE; reception of at least one non-line-of-sight (NLOS) signal by the UE; reception of no NLOS signals by the UE; a presence of another UE in a vicinity of the UE; an absence of another UE in a vicinity of the UE; that a number of possible reflecting objects in a vicinity of the UE is greater than or less than a threshold number; that no PRS received by the UE is a non-line-of-sight (NLOS) signal; that at least one PRS received by the UE is an NLOS signal; that a PRS source is a line-of-sight (LOS) or non-line-of-sight (NLOS) source; that multiple PRS sources exist or that a single PRS source exists; that multiple reflectors are or are not detected in a vicinity of the UE; that other UEs are or are not in a vicinity of the UE; or various combinations thereof.

Clause 6. The method of any of clauses 2 to 5, further comprising instructing the UE to use the second BW for receiving PRSs.

Clause 7. The method of clause 6, wherein determining the second BW to be used by the UE for receiving PRSs comprises determining a modification to be made to the first BW, and wherein instructing the UE to use the second BW for receiving PRSs comprises instructing the UE to make the modification to the first BW.

Clause 8. The method of any of clauses 2 to 7, wherein receiving the environment information comprises receiving information indicating that: the UE has not received any non-line-of-sight (NLOS) signals; all PRSs received by the UE are line-of-sight (LOS) signals; the UE has not received any multipath transmissions; there are no other UEs within a threshold distance of the UE; or a number of possible reflecting objects within a threshold distance of the UE is less than a threshold number, and wherein determining the second BW to be used by the UE for receiving PRSs based on the environment information comprises determining that the second BW to be used by the UE for receiving PRSs should be narrower than the first BW being used by the UE for receiving PRSs.

Clause 9. The method of any of clauses 2 to 8, wherein receiving the environment information comprises receiving information indicating that: the UE has received a non-line-of-sight (NLOS) signal; not all PRSs received by the UE are line-of-sight (LOS) signals; the UE has received a multipath transmission; there are other UEs within a threshold distance of the UE; or a number of possible reflecting objects within a threshold distance of the UE is not less than a threshold number, and wherein determining the second BW to be used by the UE for receiving PRSs based on the environment information comprises determining that the second BW to be used by the UE for receiving PRSs should be wider than the first BW.

Clause 10. The method of any of clauses 1 to 9, wherein determining the second BW to be used by the UE for receiving PRSs comprises: selecting the second BW to be used by the UE for receiving PRSs from a predefined set of BWs; calculating the second BW to be used by the UE for receiving PRSs by increasing or decreasing the first BW by a number; or calculating the second BW to be used by the UE for receiving PRSs by increasing or decreasing the first BW by a percentage value.

Clause 11. The method of any of clauses 1 to 10, wherein determining the second BW to be used by the UE for receiving PRSs comprises receiving, from the UE, an indication of the second BW to be used by the UE for receiving PRSs and determining the second BW to be used by the UE for receiving PRSs based on the indication.

Clause 12. The method of clause 11, wherein receiving an indication of the second BW to be used for by the UE for receiving PRSs comprises receiving: an indication of a selection of the second BW to be used by the UE for receiving PRSs from a predefined set of BWs; an indication to calculate the second BW to be used by the UE for receiving PRSs by increasing or decreasing the first BW by a number; or an indication to calculate the second BW to be used by the UE for receiving PRSs by increasing or decreasing the first BW by a percentage value.

Clause 13. The method of any of clauses 1 to 12, wherein the TE comprises a base station or a second user equipment (UE).

Clause 14. A method of wireless communication performed by a user equipment (UE), the method comprising: determining environment information about an environment in which the UE is operating using a first bandwidth (BW) for receiving positioning reference signals (PRSs); determining, based on the environment information, a second BW to be used by the UE for receiving PRSs; and using the second BW for receiving PRSs.

Clause 15. The method of clause 14, wherein determining the second BW to be used by the UE for receiving PRSs comprises: sending, to a transmitting entity (TE), the environment information; and receiving, from the TE, an indication of the second BW to be used for by the UE for receiving PRSs.

Clause 16. The method of clause 15, wherein receiving an indication of the second BW to be used by the UE for receiving PRSs comprises receiving an instruction to select the second BW from a predefined set of BWs; calculate the second BW by increasing or decreasing the first BW by a number; or calculate the second BW by increasing or decreasing the first BW by a percentage value.

Clause 17. The method of any of clauses 15 to 16, wherein the TE comprises a base station or a core network entity.

Clause 18. The method of any of clauses 14 to 17, wherein receiving the environment information comprises receiving information indicating: a number of multipath transmissions received by the UE; reception of at least one non-line-of-sight (NLOS) signal by the UE; reception of no NLOS signals by the UE; a presence of another UE in a vicinity of the UE; an absence of another UE in a vicinity of the UE; or various combinations thereof.

Clause 19. The method of any of clauses 14 to 18, wherein the determining and sending steps are performed in response to a trigger.

Clause 20. The method of clause 19, wherein the trigger is generated internally by the UE.

Clause 21. The method of clause 20, wherein the trigger comprises detection that a confidence level has satisfied or no longer satisfies a confidence level threshold.

Clause 22. The method of any of clauses 20 to 21, wherein the trigger is a periodic trigger or an aperiodic trigger.

Clause 23. The method of any of clauses 19 to 22, wherein the trigger is an external trigger received by the UE.

Clause 24. The method of clause 23, wherein the trigger is a request from a core network entity.

Clause 25. A transmitting entity (TE), comprising: a memory; at least one transceiver; and at least one processor communicatively coupled to the memory and the at least one transceiver, the at least one processor configured to: determine, based on environment information about an environment in which a user equipment (UE) that is receiving positioning reference signals (PRSs) using a first bandwidth (BW) is operating, a second BW to be used by the UE for receiving PRSs; and transmit, via the at least one transceiver, PRSs using the second BW to be used by the UE for receiving PRSs.

Clause 26. The TE of clause 25, wherein, to determine the second BW to be used by the UE for receiving PRSs, the at least one processor is configured to receive the environment information about the environment in which the UE is operating, and determining the second BW to be used by the UE for receiving PRSs based on the environment information.

Clause 27. The TE of clause 26, wherein the environment information is received from the UE, from another UE, from a base station, from a core network entity, or from an intelligent traffic system (ITS).

Clause 28. The TE of any of clauses 26 to 27, wherein the environment information is received in response to a request for the environment information.

Clause 29. The TE of any of clauses 26 to 28, wherein, to receive the environment information, the at least one processor is configured to receive information indicating: a number of multipath transmissions received by the UE; reception of at least one non-line-of-sight (NLOS) signal by the UE; reception of no NLOS signals by the UE; a presence of another UE in a vicinity of the UE; an absence of another UE in a vicinity of the UE; that a number of possible reflecting objects in a vicinity of the UE is greater than or less than a threshold number; that no PRS received by the UE is a non-line-of-sight (NLOS) signal; that at least one PRS received by the UE is an NLOS signal; that a PRS source is a line-of-sight (LOS) or non-line-of-sight (NLOS) source; that multiple PRS sources exist or that a single PRS source exists; that multiple reflectors are or are not detected in a vicinity of the UE; that other UEs are or are not in a vicinity of the UE; or various combinations thereof.

Clause 30. The TE of any of clauses 26 to 29, wherein the at least one processor is further configured to instruct the UE to use the second BW for receiving PRSs.

Clause 31. The TE of clause 30, wherein determining the second BW to be used by the UE for receiving PRSs comprises determining a modification to be made to the first BW, and wherein instructing the UE to use the second BW for receiving PRSs comprises instructing the UE to make the modification to the first BW.

Clause 32. The TE of any of clauses 26 to 31, wherein, to receive the environment information, the at least one processor is configured to receive information indicating that: the UE has not received any non-line-of-sight (NLOS) signals; all PRSs received by the UE are line-of-sight (LOS) signals; the UE has not received any multipath transmissions; there are no other UEs within a threshold distance of the UE; or a number of possible reflecting objects within a threshold distance of the UE is less than a threshold number, and wherein, to determine the second BW to be used by the UE for receiving PRSs based on the environment information, the at least one processor is configured to determine that the second BW to be used by the UE for receiving PRSs should be narrower than the first BW being used by the UE for receiving PRSs.

Clause 33. The TE of any of clauses 26 to 32, wherein, to receive the environment information, the at least one processor is configured to receive information indicating that: the UE has received a non-line-of-sight (NLOS) signal; not all PRSs received by the UE are line-of-sight (LOS) signals; the UE has received a multipath transmission; there are other UEs within a threshold distance of the UE; or a number of possible reflecting objects within a threshold distance of the UE is not less than a threshold number, and wherein, to determine the second BW to be used by the UE for receiving PRSs based on the environment information, the at least one processor is configured to determine that the second BW to be used by the UE for receiving PRSs should be wider than the first BW.

Clause 34. The TE of any of clauses 25 to 33, wherein, to determine the second BW to be used by the UE for receiving PRSs, the at least one processor is configured to: select the second BW to be used by the UE for receiving PRSs from a predefined set of BWs; calculate the second BW to be used by the UE for receiving PRSs by increasing or decreasing the first BW by a number; or calculate the second BW to be used by the UE for receiving PRSs by increasing or decreasing the first BW by a percentage value.

Clause 35. The TE of any of clauses 25 to 34, wherein, to determine the second BW to be used by the UE for receiving PRSs, the at least one processor is configured to receive, from the UE, an indication of the second BW to be used by the UE for receiving PRSs and determining the second BW to be used by the UE for receiving PRSs based on the indication.

Clause 36. The TE of clause 35, wherein, to receive an indication of the second BW to be used for by the UE for receiving PRS, the at least one processor is configured to receive: an indication of a selection of the second BW to be used by the UE for receiving PRSs from a predefined set of BWs; an indication to calculate the second BW to be used by the UE for receiving PRSs by increasing or decreasing the first BW by a number; or an indication to calculate the second BW to be used by the UE for receiving PRSs by increasing or decreasing the first BW by a percentage value.

Clause 37. The TE of any of clauses 25 to 36, wherein the TE comprises a base station or a second user equipment (UE).

Clause 38. A user equipment (UE), comprising: a memory; at least one transceiver; and at least one processor communicatively coupled to the memory and the at least one transceiver, the at least one processor configured to: determine environment information about an environment in which the UE is operating using a first bandwidth (BW) for receiving positioning reference signals (PRSs); determine, based on the environment information, a second BW to be used by the UE for receiving PRSs; and use the second BW for receiving PRSs.

Clause 39. The UE of clause 38, wherein, to determine the second BW to be used by the UE for receiving PRSs, the at least one processor is configured to: send, via the at least one transceiver, to a transmitting entity (TE), the environment information; and receive, via the at least one transceiver, from the TE, an indication of the second BW to be used for by the UE for receiving PRSs.

Clause 40. The UE of clause 39, wherein, to receive an indication of the second BW to be used by the UE for receiving PRSs, the at least one processor is configured to receive an instruction to select the second BW from a predefined set of BWs; calculate the second BW by increasing or decreasing the first BW by a number; or calculate the second BW by increasing or decreasing the first BW by a percentage value.

Clause 41. The UE of any of clauses 39 to 40, wherein the TE comprises a base station or a core network entity.

Clause 42. The UE of any of clauses 38 to 41, wherein, to receive the environment information, the at least one processor is configured to receive information indicating: a number of multipath transmissions received by the UE; reception of at least one non-line-of-sight (NLOS) signal by the UE; reception of no NLOS signals by the UE; a presence of another UE in a vicinity of the UE; an absence of another UE in a vicinity of the UE; or various combinations thereof.

Clause 43. The UE of any of clauses 38 to 42, wherein the determining and sending steps are performed in response to a trigger.

Clause 44. The UE of clause 43, wherein the trigger is generated internally by the UE.

Clause 45. The UE of clause 44, wherein the trigger comprises detection that a confidence level has satisfied or no longer satisfies a confidence level threshold.

Clause 46. The UE of any of clauses 44 to 45, wherein the trigger is a periodic trigger or an aperiodic trigger.

Clause 47. The UE of any of clauses 43 to 46, wherein the trigger is an external trigger received by the UE.

Clause 48. The UE of clause 47, wherein the trigger is a request from a core network entity.

Clause 49. A transmitting entity (TE), comprising: means for determining, based on environment information about an environment in which a user equipment (UE) that is receiving positioning reference signals (PRSs) using a first bandwidth (BW) is operating, a second BW to be used by the UE for receiving PRSs; and means for transmitting PRSs using the second BW to be used by the UE for receiving PRSs.

Clause 50. The TE of clause 49, wherein the means for determining the second BW to be used by the UE for receiving PRSs comprises means for receiving the environment information about the environment in which the UE is operating, and determining the second BW to be used by the UE for receiving PRSs based on the environment information.

Clause 51. The TE of clause 50, wherein the means for receiving the environment information about the environment in which the UE is operating comprises means for receiving the environment information about the environment in which the UE is operating from the UE, from another UE, from a base station, from a core network entity, or from an intelligent traffic system (ITS).

Clause 52. The TE of any of clauses 50 to 51, wherein the means for receiving the environment information about the environment in which the UE is operating means for receiving the environment information about the environment in which the UE is operating in response to a request for the environment information.

Clause 53. The TE of any of clauses 50 to 52, wherein the means for receiving the environment information comprises means for receiving information indicating: a number of multipath transmissions received by the UE; reception of at least one non-line-of-sight (NLOS) signal by the UE; reception of no NLOS signals by the UE; a presence of another UE in a vicinity of the UE; an absence of another UE in a vicinity of the UE; that a number of possible reflecting objects in a vicinity of the UE is greater than or less than a threshold number; that no PRS received by the UE is a non-line-of-sight (NLOS) signal; that at least one PRS received by the UE is an NLOS signal; that a PRS source is a line-of-sight (LOS) or non-line-of-sight (NLOS) source; that multiple PRS sources exist or that a single PRS source exists; that multiple reflectors are or are not detected in a vicinity of the UE; that other UEs are or are not in a vicinity of the UE; or various combinations thereof.

Clause 54. The TE of any of clauses 50 to 53, further comprising means for instructing the UE to use the second BW for receiving PRSs.

Clause 55. The TE of clause 54, wherein the means for determining the second BW to be used by the UE for receiving PRSs comprises means for determining a modification to be made to the first BW, and wherein the means for instructing the UE to use the second BW for receiving PRSs comprises means for instructing the UE to make the modification to the first BW.

Clause 56. The TE of any of clauses 50 to 55, wherein the means for receiving the environment information comprises means for receiving information indicating that: the UE has not received any non-line-of-sight (NLOS) signals; all PRSs received by the UE are line-of-sight (LOS) signals; the UE has not received any multipath transmissions; there are no other UEs within a threshold distance of the UE; or a number of possible reflecting objects within a threshold distance of the UE is less than a threshold number, and wherein the means for determining the second BW to be used by the UE for receiving PRSs based on the environment information comprises means for determining that the second BW to be used by the UE for receiving PRSs should be narrower than the first BW being used by the UE for receiving PRSs.

Clause 57. The TE of any of clauses 50 to 56, wherein the means for receiving the environment information comprises means for receiving information indicating that: the UE has received a non-line-of-sight (NLOS) signal; not all PRSs received by the UE are line-of-sight (LOS) signals; the UE has received a multipath transmission; there are other UEs within a threshold distance of the UE; or a number of possible reflecting objects within a threshold distance of the UE is not less than a threshold number, and wherein the means for determining the second BW to be used by the UE for receiving PRSs based on the environment information comprises means for determining that the second BW to be used by the UE for receiving PRSs should be wider than the first BW.

Clause 58. The TE of any of clauses 49 to 57, wherein the means for determining the second BW to be used by the UE for receiving PRSs comprises: means for selecting the second BW to be used by the UE for receiving PRSs from a predefined set of BWs; means for calculating the second BW to be used by the UE for receiving PRSs by increasing or decreasing the first BW by a number; or means for calculating the second BW to be used by the UE for receiving PRSs by increasing or decreasing the first BW by a percentage value.

Clause 59. The TE of any of clauses 49 to 58, wherein the means for determining the second BW to be used by the UE for receiving PRSs comprises means for receiving, from the UE, an indication of the second BW to be used by the UE for receiving PRSs and determining the second BW to be used by the UE for receiving PRSs based on the indication.

Clause 60. The TE of clause 59, wherein the means for receiving an indication of the second BW to be used for by the UE for receiving PRSs comprises means for receiving: an indication of a selection of the second BW to be used by the UE for receiving PRSs from a predefined set of BWs; an indication to calculate the second BW to be used by the UE for receiving PRSs by increasing or decreasing the first BW by a number; or an indication to calculate the second BW to be used by the UE for receiving PRSs by increasing or decreasing the first BW by a percentage value.

Clause 61. The TE of any of clauses 49 to 60, wherein the TE comprises a base station or a second user equipment (UE).

Clause 62. A user equipment (UE), comprising: means for determining environment information about an environment in which the UE is operating using a first bandwidth (BW) for receiving positioning reference signals (PRSs); means for determining, based on the environment information, a second BW to be used by the UE for receiving PRSs; and means for using the second BW for receiving PRSs.

Clause 63. The UE of clause 62, wherein the means for determining the second BW to be used by the UE for receiving PRSs comprises: means for sending, to a transmitting entity (TE), the environment information; and means for receiving, from the TE, an indication of the second BW to be used for by the UE for receiving PRSs.

Clause 64. The UE of clause 63, wherein the means for receiving an indication of the second BW to be used by the UE for receiving PRSs comprises means for receiving an instruction to means for selecting the second BW from a predefined set of BWs; means for calculating the second BW by increasing or decreasing the first BW by a number; or means for calculating the second BW by increasing or decreasing the first BW by a percentage value.

Clause 65. The UE of any of clauses 63 to 64, wherein the TE comprises a base station or a core network entity.

Clause 66. The UE of any of clauses 62 to 65, wherein the means for receiving the environment information comprises means for receiving information indicating: a number of multipath transmissions received by the UE; reception of at least one non-line-of-sight (NLOS) signal by the UE; reception of no NLOS signals by the UE; a presence of another UE in a vicinity of the UE; an absence of another UE in a vicinity of the UE; or various combinations thereof.

Clause 67. The UE of any of clauses 62 to 66, wherein the determining and sending steps are performed in response to a trigger.

Clause 68. An apparatus comprising a memory, a transceiver, and a processor communicatively coupled to the memory and the transceiver, the memory, the transceiver, and the processor configured to perform a method according to any of clauses 1 to 24.

Clause 69. An apparatus comprising means for performing a method according to any of clauses 1 to 24.

Clause 70. A non-transitory computer-readable medium storing computer-executable instructions, the computer-executable comprising at least one instruction for causing a computer or processor to perform a method according to any of clauses 1 to 24.

Additional aspects are described below:

In an aspect, a method of wireless communication, comprising, at a TE: receiving environment information about an environment in which a UE is operating; determining, based on the environment information, a BW to be used for PRSs; and using the BW for PRSs, instructing the UE to use the BW for PRSs, or both. In some aspects, the UE comprises a UE. In some aspects, the TE comprises a base station or a core network entity. In some aspects, the TE comprises second UE.

In some aspects, the environment information is received from the UE. In some aspects, the environment information comprises information indicating: a number of multipath transmissions received by the UE; reception of at least one NLOS signal by the UE; reception of no NLOS signals by the UE; a presence of another UE in a vicinity of the UE; an absence of another UE in a vicinity of the UE; or various combinations thereof. In some aspects, the environment information is received from an entity other than the UE. In some aspects, the environment information is received from a core network entity.

In some aspects, the core network entity comprises a location server.

In some aspects, the environment information comprises information indicating: that a number of possible reflecting objects in a vicinity of the UE is greater than or less than a threshold number; that none of the PRSs received by the UE are NLOS signals; that at least one of the PRSs received by the UE is an NLOS signal; or various combinations thereof. In some aspects, the environment information is received from a UE. In some aspects, the environment information is received via an ITS. In some aspects, the environment information comprises information indicating: that a PRS source is a LOS or NLOS source; that multiple PRS sources exist or that a single PRS source exists; that multiple reflectors are or are not detected in a vicinity of the UE; that other UEs are or are not in a vicinity of the UE; or various combinations thereof.

In some aspects, determining a BW to be used for PRS comprises determining a modification to be made to a PRS BW currently used by the UE, and instructing the UE to use the PRS BW comprises instructing the UE to make the modification.

In some aspects, the environment information is received in response to a request for the environment information.

In some aspects, determining a BW to be used for PRS comprises determining to use a first bandwidth (BW1) or a second bandwidth (BW2) that is less than BW1, based on the environment information.

In some aspects, BW1 comprises an entire bandwidth supported by the UE.

In some aspects, BW1 comprises less than an entire bandwidth supported by the UE.

In some aspects, determining a BW to be used for PRS based on the environment information comprises using BW2 if the environment information indicates that: the UE has not received any NLOS signals; all PRSs received by the UE are LOS signals; the UE has not received any multipath transmissions; there are no other UEs within a threshold distance of the UE; or a number of possible reflecting objects within a threshold distance of the UE is less than a threshold number.

In some aspects, determining a BW to be used for PRS based on the environment information comprises using BW1 if the environment information indicates that: the UE has received a NLOS signal; not all PRSs received by the UE are LOS signals; the UE has received a multipath transmission; there are other UEs within a threshold distance of the UE; or a number of possible reflecting objects within a threshold distance of the UE is not less than a threshold number.

In some aspects, determining a BW to be used for PRS comprises determining to decrease or increase a current PRS BW used by the UE, based on the environment information.

In some aspects, determining to decrease or increase the current PRS BW used by the UE comprises selecting one bandwidth from a predefined set of bandwidths.

In some aspects, one of the bandwidths from the predefined set of bandwidths comprises an entire bandwidth supported by the UE.

In some aspects, the predefined set of bandwidths defines three different bandwidths.

In some aspects, the predefined set of bandwidths defines more than three different bandwidths.

In some aspects, determining to decrease or increase the current PRS BW used by the UE comprises increasing or decreasing the current PRS BW used by the UE by a number or percentage value.

In some aspects, determining a BW to be used for PRS based on the environment information comprises decreasing the current PRS BW used by the UE if the environment information indicates that: the UE has not received any NLOS signals; all PRSs received by the UE are LOS signals; the UE has not received any multipath transmissions; there are no other UEs within a threshold distance of the UE; or a number of possible reflecting objects within a threshold distance of the UE is less than a threshold number.

In some aspects, determining a BW to be used for PRS based on the environment information comprises increasing the current PRS BW used by the UE if the environment information indicates that: the UE has received a NLOS signal; not all PRSs received by the UE are LOS signals; the UE has received a multipath transmission; there are other UEs within a threshold distance of the UE; or a number of possible reflecting objects within a threshold distance of the UE is not less than a threshold number.

In an aspect, a method of wireless communication, comprising, at a UE: determining environment information about an environment in which the UE is operating; and sending, to a TE, the environment information.

In some aspects, the UE comprises a UE.

In some aspects, the TE comprises a base station or a core network entity.

In some aspects, the environment information comprises information indicating: a number of multipath transmissions received by the UE; reception of at least one NLOS signal by the UE; reception of no NLOS signals by the UE; a presence of another UE in a vicinity of the UE; an absence of another UE in a vicinity of the UE; or various combinations thereof.

In some aspects, the determining and sending steps are performed in response to a trigger.

In some aspects, the trigger is generated internally by the UE.

In some aspects, the trigger comprises detection that a confidence level has satisfied or
no longer satisfies a confidence level threshold.

In some aspects, the trigger is a periodic trigger or an aperiodic trigger.

In some aspects, the trigger is an external trigger received by the UE.

In some aspects, the trigger is a request from a core network entity.

In some aspects, the method includes receiving, from the TE, an indication of a BW to use for PRSs.

In some aspects, receiving an indication of a BW to use for PRSs comprises receiving an instruction to decrease or increase a current BW used for PRSs.

In some aspects, receiving an instruction to decrease or increase a current BW used for PRSs comprises an instruct to select one bandwidth from a predefined set of bandwidths.

In some aspects, one of the bandwidths from the predefined set of bandwidths comprises an entire bandwidth supported by the UE.

In some aspects, the predefined set of bandwidths defines three different bandwidths.

In some aspects, the predefined set of bandwidths defines more than three different bandwidths.

In some aspects, receiving an instruction to decrease or increase a current BW used for PRSs comprises receiving an instruction to increase or decrease the current PRS BW used by the UE by a number or percentage value.

In some aspects, the method includes using the BW for PRSs.

In an aspect, a TE includes a memory; at least one network interface; and at least one processor communicatively coupled to the memory and the at least one network interface, the at least one processor configured to receive environment information about an environment in which a UE is operating; determine, based on the environment information, a BW to be used for PRSs; and use the BW for PRSs, instructing the UE to use the BW for PRSs, or both.

In some aspects, the environment information is received from the UE.

In some aspects, the environment information comprises information indicating: a number of multipath transmissions received by the UE; reception of at least one NLOS signal by the UE; reception of no NLOS signals by the UE; a presence of another UE in a vicinity of the UE; an absence of another UE in a vicinity of the UE; or various combinations thereof.

In some aspects, the environment information is received from an entity other than the UE.

In some aspects, the environment information is received from a core network entity.

In some aspects, the core network entity comprises a location server.

In some aspects, the environment information comprises information indicating: that a number of possible reflecting objects in a vicinity of the UE is greater than or less than a threshold number; that none of the PRSs received by the UE are NLOS signals; that at least one of the PRSs received by the UE is an NLOS signal; or various combinations thereof.

In some aspects, the environment information is received from a UE.

In some aspects, the environment information is received via an ITS.

In some aspects, the environment information comprises information indicating: that a PRS source is a LOS or NLOS source; that multiple PRS sources exist or that a single PRS source exists; that multiple reflectors are or are not detected in a vicinity of the UE; that other UEs are or are not in a vicinity of the UE; or various combinations thereof.

In some aspects, determining a BW to be used for PRS comprises determining a modification to be made to a PRS BW currently used by the UE, and instructing the UE to use the PRS BW comprises instructing the UE to make the modification.

In some aspects, the environment information is received in response to a request for the environment information.

In some aspects, determining a BW to be used for PRS comprises determining to use a first bandwidth (BW1) or a second bandwidth (BW2) that is less than BW1, based on the environment information.

In some aspects, BW1 comprises an entire bandwidth supported by the UE.

In some aspects, BW1 comprises less than an entire bandwidth supported by the UE.

In some aspects, determining a BW to be used for PRS based on the environment information comprises using BW2 if the environment information indicates that: the UE has not received any NLOS signals; all PRSs received by the UE are LOS signals; the UE has not received any multipath transmissions; there are no other UEs within a threshold distance of the UE; or a number of possible reflecting objects within a threshold distance of the UE is less than a threshold number.

In some aspects, determining a BW to be used for PRS based on the environment information comprises using BW1 if the environment information indicates that: the UE has received a NLOS signal; not all PRSs received by the UE are LOS signals; the UE has received a multipath transmission; there are other UEs within a threshold distance of the UE; or a number of possible reflecting objects within a threshold distance of the UE is not less than a threshold number.

In some aspects, determining a BW to be used for PRS comprises determining to decrease or increase a current PRS BW used by the UE, based on the environment information.

In some aspects, determining to decrease or increase the current PRS BW used by the UE comprises selecting one bandwidth from a predefined set of bandwidths.

In some aspects, one of the bandwidths from the predefined set of bandwidths comprises an entire bandwidth supported by the UE.

In some aspects, the predefined set of bandwidths defines three different bandwidths.

In some aspects, the predefined set of bandwidths defines more than three different bandwidths.

In some aspects, determining to decrease or increase the current PRS BW used by the UE comprises increasing or decreasing the current PRS BW used by the UE by a number or percentage value.

In some aspects, determining a BW to be used for PRS based on the environment information comprises decreasing the current PRS BW used by the UE if the environment information indicates that: the UE has not received any NLOS signals; all PRSs received by the UE are LOS signals; the UE has not received any multipath transmissions; there are no other UEs within a threshold distance of the UE; or a number of possible reflecting objects within a threshold distance of the UE is less than a threshold number.

In some aspects, determining a BW to be used for PRS based on the environment information comprises increasing the current PRS BW used by the UE if the environment information indicates that: the UE has received a NLOS signal; not all PRSs received by the UE are LOS signals; the UE has received a multipath transmission; there are other UEs within a threshold distance of the UE; or a number of possible reflecting objects within a threshold distance of the UE is not less than a threshold number.

In some aspects, the TE comprises a base station.

In some aspects, the TE comprises a core network entity.

In some aspects, the TE comprises a location server.

In some aspects, the TE comprises a UE.

In an aspect, a UE includes a memory; at least one transceiver; and at least one processor communicatively coupled to the memory and the at least one transceiver, the at least one processor configured to: determine environment information about an environment in which the UE is operating; and send, to a TE, the environment information.

In some aspects, the environment information comprises information indicating: a number of multipath transmissions received by the UE; reception of at least one NLOS signal by the UE; reception of no NLOS signals by the UE; a presence of another UE in a vicinity of the UE; an absence of another UE in a vicinity of the UE; or various combinations thereof.

In some aspects, the determining and sending steps are performed in response to a trigger.

In some aspects, the trigger is generated internally by the UE.

In some aspects, the trigger comprises detection that a confidence level has satisfied or no longer satisfies a confidence level threshold.

In some aspects, the trigger is a periodic trigger or an aperiodic trigger.

In some aspects, the trigger is an external trigger received by the UE.

In some aspects, the trigger is a request from a core network entity.

In some aspects, the method includes receiving, from the TE, an indication of a BW to use for PRSs.

In some aspects, receiving an indication of a BW to use for PRSs comprises receiving an instruction to decrease or increase a current BW used for PRSs.

In some aspects, receiving an instruction to decrease or increase a current BW used for PRSs comprises an instruct to select one bandwidth from a predefined set of bandwidths.

In some aspects, one of the bandwidths from the predefined set of bandwidths comprises an entire bandwidth supported by the UE.

In some aspects, the predefined set of bandwidths defines three different bandwidths.

In some aspects, the predefined set of bandwidths defines more than three different bandwidths.

In some aspects, receiving an instruction to decrease or increase a current BW used for PRSs comprises receiving an instruction to increase or decrease the current PRS BW used by the UE by a number or percentage value.

In some aspects, the method includes using the BW for PRSs.

In some aspects, the UE comprises a UE.

In some aspects, the TE comprises a base station or a core network entity.

In an aspect, a TE includes means for receiving environment information about an environment in which a UE is operating; means for determining, based on the environment information, a BW to be used for PRSs; and means for using the BW for PRSs, instructing the UE to use the BW for PRSs, or both.

In an aspect, a UE includes means for determining environment information about an environment in which the UE is operating; and means for sending, to a TE, the environment information.

In an aspect, a non-transitory computer-readable medium storing instructions for causing at least one processor in a TE to: receive environment information about an environment in which a UE is operating; determine, based on the environment information, a BW to be used for PRSs; and use the BW for PRSs, instruct the UE to use the BW for PRSs, or both.

In an aspect, a non-transitory computer-readable medium storing instructions for causing at least one processor in a UE to: determine environment information about an environment in which the UE is operating; and send, to a TE, the environment information.

While the foregoing disclosure shows illustrative aspects of the disclosure, it should be noted that various changes and modifications could be made herein without departing from the scope of the disclosure as defined by the appended claims. The functions, steps or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a transmitting entity (TE), the method comprising:
   determining, based on environment information about an environment in which a first user equipment (UE) that is receiving a first plurality of positioning reference signals (PRSs) using a first bandwidth (BW) is operating, a second BW to be used by the UE for receiving PRSs;
   transmitting a second plurality of PRSs using the second BW to be used by the UE for receiving PRSs;
   transmitting by the TE, to a location server, at least some of the environment information, wherein the location server identifies another UE, in the vicinity of the first UE, affected by the environment of the first UE; and
   determining, based on the location server identifying the another UE affected by the environment of the first UE, by the TE a new PRS bandwidth to be used by the another UE.

2. The method of claim 1, wherein determining the second BW to be used by the first UE for receiving PRSs comprises receiving, by the TE, the environment information about the environment in which the first UE is operating, and determining the second BW to be used by the first UE for receiving PRSs based on the environment information.

3. The method of claim 2, wherein the environment information is received from the first UE, from the another UE, from a base station, from a core network entity, or from an intelligent traffic system (ITS).

4. The method of claim 2, wherein receiving the environment information comprises receiving information indicating that a PRS source is a line-of-sight (LOS) or non-line-of-sight (NLOS) source, and wherein the environment information comprises:
   a first number indicating how many multipath transmissions were received by the first UE;
   a second number indicating how many non-line-of-sight (NLOS) signals were received by the first UE;
   a third number indicating whether or not other UEs are in the vicinity of the first UE;
   a fourth number indicating how many possible reflecting objects are in the vicinity of the first UE;
   a fifth number indicating how many PRS signals received by the first UE were NLOS signals;
   a sixth number indicating how many PRS signals received by the first UE were line of sight (LOS) signals;
   a seventh number indicating how many PRS sources were detected by the first UE; or
   various combinations thereof.

5. The method of claim 2, further comprising, when the second BW is determined both by the first UE and the TE, instructing the first UE to use the second BW, determined by the TE, for receiving PRSs.

6. The method of claim 5, wherein determining the second BW to be used by the first UE for receiving PRSs comprises determining a modification to be made to the first BW, and wherein instructing the first UE to use the second BW for receiving PRSs comprises instructing the first UE to make the modification to the first BW.

7. The method of claim 2, wherein the environment information indicates that the first UE has not received any non-line-of-sight (NLOS) signals, that all PRSs received by the first UE are line-of-sight (LOS) signals, that the first UE has not received any multipath transmissions, that there are no other UEs within a threshold distance of the first UE, or that a number of possible reflecting objects within the threshold distance of the first UE is less than a threshold number, and
   wherein determining the second BW to be used by the first UE for receiving PRSs based on the environment information comprises determining that the second BW to be used by the first UE for receiving PRSs should be narrower than the first BW being used by the first UE for receiving PRSs.

8. The method of claim 2, wherein the environment information indicates that the first UE has received a non-line-of-sight (NLOS) signal, that not all PRSs received by the first UE are line-of-sight (LOS) signals, that the first UE has received a multipath transmission, that there are other UEs within a threshold distance of the first UE, or that a number of possible reflecting objects within the threshold distance of the first UE is not less than a threshold number, and
   wherein determining the second BW to be used by the first UE for receiving PRSs based on the environment information comprises determining that the second BW to be used by the first UE for receiving PRSs should be wider than the first BW.

9. The method of claim 1, wherein determining the second BW to be used by the first UE for receiving PRSs comprises:
   selecting the second BW to be used by the first UE for receiving PRSs from a predefined set of BWs;
   calculating the second BW to be used by the first UE for receiving PRSs by increasing or decreasing the first BW by a number; or
   calculating the second BW to be used by the first UE for receiving PRSs by increasing or decreasing the first BW by a percentage value.

10. The method of claim 1, wherein determining the second BW to be used by the first UE for receiving PRSs comprises receiving, from the first UE, an indication of the second BW to be used by the first UE for receiving PRSs and determining the second BW to be used by the first UE for receiving PRSs based on the indication.

11. The method of claim 10, wherein receiving an indication of the second BW to be used for by the first UE for receiving PRSs comprises receiving:
- an indication of a selection of the second BW to be used by the first UE for receiving PRSs from a predefined set of BWs;
- an indication to calculate the second BW to be used by the first UE for receiving PRSs by increasing or decreasing the first BW by a number; or
- an indication to calculate the second BW to be used by the first UE for receiving PRSs by increasing or decreasing the first BW by a percentage value.

12. The method of claim 1, wherein the TE comprises a base station, the another UE, or a second UE that is different from the another UE.

13. The method of claim 1, wherein the environment information comprises information indicating that:
- the first UE has received a non-line-of-sight (NLOS) signal;
- not all PRSs received by the first UE are line-of-sight (LOS) signals;
- the UE first has received a multipath transmission;
- there are other UEs within a threshold distance of the first UE; or
- a number of possible reflecting objects within the threshold distance of the first UE is not less than a threshold number.

14. A method of wireless communication performed by a first user equipment (UE), the method comprising:
- determining environment information about an environment in which the first UE is operating using a first bandwidth (BW) for receiving a first plurality of positioning reference signals (PRSs);
- determining, based on the environment information, a second BW to be used by the first UE for receiving PRSs, wherein the second BW is determined both by the first UE and a transmitting entity (TE);
- using the second BW for receiving a second plurality of PRSs, wherein determining the second BW comprises receiving, from the TE, an indication of the second BW to be used by the first UE, based on environment information sent from the TE to a location server, for receiving PRSs, wherein the first UE is configured to receive from the location server an indication of another UE, in the vicinity of the first UE, and an indication that the TE has determined a new PRS bandwidth to be used by the another UE.

15. The method of claim 14, wherein receiving the indication of the second BW to be used by the first UE for receiving PRSs comprises receiving an instruction to
- select the second BW from a predefined set of BWs;
- calculate the second BW by increasing or decreasing the first BW by a number; or
- calculate the second BW by increasing or decreasing the first BW by a percentage value.

16. The method of claim 14, wherein the determining steps are performed in response to a trigger.

17. The method of claim 16, wherein the trigger is generated internally by the first UE.

18. The method of claim 17, wherein the trigger comprises detection that a confidence level has satisfied or no longer satisfies a confidence level threshold.

19. The method of claim 17, wherein the trigger is a periodic trigger or an aperiodic trigger.

20. The method of claim 16, wherein the trigger is an external trigger received by the first UE.

21. The method of claim 20, wherein the trigger is a request from a core network entity.

22. A transmitting entity (TE), comprising:
- a memory;
- at least one transceiver; and
- at least one processor communicatively coupled to the memory and the at least one transceiver, the at least one processor configured to:
  - determine, based on environment information about an environment in which a first user equipment (UE) that is receiving a first plurality of positioning reference signals (PRSs) using a first bandwidth (BW) is operating, a second BW to be used for by the first UE for receiving PRSs;
  - transmit a second plurality of PRSs using the second BW to be used by the first UE for receiving PRSs;
  - transmit by the TE, to a location server, at least some of the environment information, wherein the location server identifies another UE, in the vicinity of the first UE, affected by the environment of the first UE; and
  - determine, based on the location server identifying the another UE affected by the environment of the UE, by the TE a new PRS bandwidth to be used by the another UE.

23. The TE of claim 22, wherein, to determine the second BW to be used by the first UE for receiving PRSs, the at least one processor is configured to receive, by the TE, the environment information about the environment in which the first UE is operating, and determine the second BW to be used by the first UE for receiving PRSs based on the environment information.

24. The TE of claim 23, wherein the at least one processor is further configured to instruct the first UE to use the second BW for receiving PRSs.

25. The TE of claim 22, wherein, to determine the second BW to be used by the first UE for receiving PRSs, the at least one processor is configured to receive, from the first UE, an indication of the second BW to be used by the first UE for receiving PRSs and to determine the second BW to be used by the first UE for receiving PRSs based on the indication.

* * * * *